(12) United States Patent
Vaughan et al.

(10) Patent No.: US 12,554,707 B1
(45) Date of Patent: Feb. 17, 2026

(54) DATABASE MANAGEMENT SYSTEMS USING HIERARCHICALLY-ENFORCED DATABASE ASSOCIATION METADATA

(71) Applicant: Optum, Inc., Minnetonka, MN (US)

(72) Inventors: Paul W. Vaughan, Austin, TX (US); Bernard M. Wong, Austin, TX (US); Munavvar Khan, Georgetown, TX (US)

(73) Assignee: Optum, Inc., Minnetonka, MN (US)

( * ) Notice: Subject to any disclaimer, the term of this patent is extended or adjusted under 35 U.S.C. 154(b) by 116 days.

(21) Appl. No.: 17/816,211

(22) Filed: Jul. 29, 2022

(51) Int. Cl.
*G06F 16/242* (2019.01)
*G06F 16/21* (2019.01)
*G06F 16/28* (2019.01)

(52) U.S. Cl.
CPC ............ *G06F 16/244* (2019.01); *G06F 16/21* (2019.01); *G06F 16/285* (2019.01)

(58) Field of Classification Search
CPC ....... G06F 16/244; G06F 16/21; G06F 16/285
See application file for complete search history.

(56) References Cited

U.S. PATENT DOCUMENTS

| | | | | |
|---|---|---|---|---|
| 5,752,242 | A * | 5/1998 | Havens | G06F 16/335 |
| 6,760,721 | B1 * | 7/2004 | Chasen | G06F 16/20 |
| | | | | 707/999.005 |
| 10,614,481 | B1 * | 4/2020 | Haarstick | G06Q 30/0242 |
| 10,795,924 | B2 * | 10/2020 | Simms | G06F 16/48 |

(Continued)

OTHER PUBLICATIONS

Di Rico, Rehana et al. "Patient-Specific Record Linkage Between Emergency Department and Hospital Admission Data for a Cohort of People Who Inject Drugs: Methodological Considerations For Frequent Presenters," BMC Medical Research Methodology, vol. 20, No. 283, pp. 1-9, Nov. 2020, DOI: 10.1186/s12874-020-01163-z.

(Continued)

*Primary Examiner* — Van H Oberly
*Assistant Examiner* — Brooks T Hale
(74) *Attorney, Agent, or Firm* — Alston & Bird LLP

(57) ABSTRACT

Various embodiments of the present invention provide methods, apparatuses, systems, computing devices, computing entities, and/or the like for facilitating efficient and effective execution of database management operations. For example, various embodiments describe generating data associated with a database association management platform that enables an end user to generate/maintain database association metadata for a database using a sequence of record relationship instructions, such as a sequence comprising at least one of record-structure inclusion (RSI) instructions, record-structure exclusion (RSE) instructions, record-structure non-inclusion (RSNI) instructions, record-structure non-exclusion (RSEI) instructions, and new structure creation (NSC) instructions. As another example, various embodiments describe performing hierarchical database record aggregation/matching by defining hierarchically-differentiated tiers of a cross-record matching logic, for example by defining a superseding/referential hierarchical matching logic that may be generated based at least in part on manually-entered record relationship instructions as reflected in the database association metadata.

20 Claims, 18 Drawing Sheets

(56) References Cited

U.S. PATENT DOCUMENTS

| | | | |
|---|---|---|---|
| 2005/0137892 A1* | 6/2005 | Porter | G06Q 30/06 |
| | | | 705/26.1 |
| 2008/0115193 A1 | 5/2008 | Prax et al. | |
| 2008/0133486 A1* | 6/2008 | Fitzgerald | G06F 9/455 |
| | | | 718/1 |
| 2008/0133570 A1* | 6/2008 | Allen | G06F 16/2428 |
| | | | 707/999.102 |
| 2009/0019003 A1* | 1/2009 | Bohannon | G06Q 30/02 |
| 2012/0203576 A1 | 8/2012 | Bucur et al. | |
| 2013/0080192 A1 | 3/2013 | Bucur et al. | |
| 2016/0299973 A1* | 10/2016 | Oakeson | G06F 16/9535 |
| 2017/0364639 A1 | 12/2017 | Vdovjak | |
| 2018/0227176 A1* | 8/2018 | Ponnuswamy | H04L 41/142 |

OTHER PUBLICATIONS

Shemilt, Ian et al. "Machine Learning Reduced Workload for the Cochrane COVID-19 Study Register: Development and Evaluation of the Cochrane COVID-19 Study Classifier," Systematic Reviews, vol. 11, No. 15, pp. 1-8, Jan. 22, 2022, DOI: 10.1186/s13643-021-01880-6.

\* cited by examiner

| Source | Patient ID | Name | Address | Phone Number | Gender | Date of Birth |
|---|---|---|---|---|---|---|
| Sisters of Mercy East | 12 | Billy Johns, Sr | 467 Mercer Street | 818-456-7890 | M | 4/25/1954 |
| Regional Clinic | 3 | Bill Johns | 467 Mercer Street | 818-456-7890 | M | 4/25/1954 |
| Pain in the Back Chiropracty | 41 | John Bill | 467 Mercer Street | 818-456-7890 | M | 4/25/1954 |
| United Health Care | 12 | Bill Johns | 467 Mercer Street | 555-123-4567 | M | 4/25/1954 |
| Sisters of Mercy ED | 34 | Bill Johns, Jr | 467 Mercer Street | 818-456-7890 | M | 9/25/1992 |
| United Health Care | 64 | Bill Johns | 467 Mercer Street | 818-456-7890 | M | 4/25/1950 |

IdentitySpec1 specID:
   13434

Including:
   {{(Sisters of Mercy East, 12), (Regional Clinic, 3), (Pain in the Back Chiropracty, 41), (United Health Care, 64)}} — 601

Excluding:
   {{(United Health Care, 12)}} — 602

Timestamp:
   4/23/2022 on 4:00 PM

FIG. 6

DATABASE CONSOLIDATION MANAGEMENT PLATFORM

700

*Existing IdentitySpecs*

IdentitySpec1
specID: 13434

Records with no SpecID

| | |
|---|---|
| Sisters of Mercy East; 12; Billy Johns, Sr; 467 Mercer Street; 818-456-7890; M; 4/25/1954 | +_ |
| Regional Clinic; 3; Bill Johns; 467 Mercer Street; 818-456-7890; M; 4/25/1954 | +_ |
| Pain in the Back Chiropracty; 41; John Bill; 467 Mercer Street; 818-456-7890; M; 4/25/1954 | +_ |
| United Health Care; 64; Bill Johns; 467 Mercer Street; 818-456-7890; M; 4/25/1950 | -_ |
| United Health Care; 12; Bill Johns; 467 Mercer Street; 555-123-4567; M; 9/25/1954 | |
| Sisters of Mercy ED; 34; Bill Johns, Jr; 467 Mercer Street; 818-456-7890; M; 9/25/1992 | +👆 -  |
| Nebraska Dermatology; 22; Bill Johns, Jr; 467 Mercer Street; 828-456-7890; M; 9/25/1982 | + - |

DATABASE CONSOLIDATION MANAGEMENT PLATFORM

*Existing IdentitySpecs*

IdentitySpec1
specID: 13434

*Records with no SpecID*

| | |
|---|---|
| Sisters of Mercy East; 12; Billy Johns, Sr; 467 Mercer Street; 818-456-7890; M; 4/25/1954 | +/- |
| Regional Clinic; 3; Bill Johns; 467 Mercer Street; 818-456-7890; M; 4/25/1954 | +/- |
| Pain in the Back Chiropracty; 41; John Bill; 467 Mercer Street; 818-456-7890; M; 4/25/1954 | +/- |
| United Health Care; 64; Bill Johns; 467 Mercer Street; 818-456-7890; M; 4/25/1950 | +/- |
| Sisters of Mercy ED; 34; Bill Johns, Jr; 467 Mercer Street; 818-456-7890; M; 9/25/1992 | -/- |
| United Health Care; 12; Bill Johns; 467 Mercer Street; 555-123-4567; M; 9/25/1954 | + - |
| Nebraska Dermatology; 22; Bill Johns, Jr; 467 Mercer Street; 828-456-7890; M; 9/25/1982 | |

DATABASE CONSOLIDATION MANAGEMENT PLATFORM

700

*Existing IdentitySpecs*

IdentitySpec1
specID: 13434

| Record | |
|---|---|
| Sisters of Mercy East; 12; Billy Johns, Sr; 467 Mercer Street; 818-456-7890; M; 4/25/1954 | +/- |
| Regional Clinic; 3; Bill Johns; 467 Mercer Street; 818-456-7890; M; 4/25/1954 | +/- |
| Pain in the Back Chiropracty; 41; John Bill; 467 Mercer Street; 818-456-7890; M; 4/25/1954 | +/- |
| United Health Care; 64; Bill Johns; 467 Mercer Street; 818-456-7890; M; 4/25/1950 | +/- |
| Sisters of Mercy ED; 34; Bill Johns, Jr; 467 Mercer Street; 818-456-7890; M; 9/25/1992 | +/- |
| United Health Care; 12; Bill Johns; 467 Mercer Street; 555-123-4567; M; 9/25/1954 | -/- |
| Nebraska Dermatology; 22; Bill Johns, Jr; 467 Mercer Street; 828-456-7890; M; 9/25/1982 | -/- |

_Records with no SpecID_

DATABASE CONSOLIDATION MANAGEMENT PLATFORM

_Existing IdentitySpecs_

IdentitySpec1
specID: 13434

Records with no SpecID

| | |
|---|---|
| Sisters of Mercy East; 12; Billy Johns, Sr; 467 Mercer Street; 818-456-7890; M; 4/25/1954 | +_ |
| Regional Clinic; 3; Bill Johns; 467 Mercer Street; 818-456-7890; M; 4/25/1954 | +_ |
| Pain in the Back Chiropracty; 41; John Bill; 467 Mercer Street; 818-456-7890; M; 4/25/1954 | +_ |
| United Health Care; 64; Bill Johns; 467 Mercer Street; 818-456-7890; M; 4/25/1950 | = |
| United Health Care; 12; Bill Johns; 467 Mercer Street; 555-123-4567; M; 9/25/1954 | = |
| Nebraska Dermatology; 22; Bill Johns, Jr; 467 Mercer Street; 828-456-7890; M; 9/25/1982 | = |
| Sisters of Mercy ED; 34; Bill Johns, Jr; 467 Mercer Street; 818-456-7890; M; 9/25/1992 | + - |

DATABASE CONSOLIDATION MANAGEMENT PLATFORM

700

Existing IdentitySpecs

IdentitySpec1
specID: 13434

Records with no SpecID

| | |
|---|---|
| Sisters of Mercy East; 12; Billy Johns, Sr; 467 Mercer Street; 818-456-7890; M; 4/25/1954 | +<u>!</u> |
| Regional Clinic; 3; Bill Johns; 467 Mercer Street; 818-456-7890; M; 4/25/1954 | +<u>!</u> |
| Pain in the Back Chiropracty; 41; John Bill; 467 Mercer Street; 818-456-7890; M; 4/25/1954 | +<u>!</u> |
| United Health Care; 64; Bill Johns; 467 Mercer Street; 818-456-7890; M; 4/25/1950 | |
| United Health Care; 12; Bill Johns; 467 Mercer Street; 555-123-4567; M; 9/25/1954 | <u>!</u> <u>!</u> |
| Sisters of Mercy ED; 34; Bill Johns, Jr; 467 Mercer Street; 818-456-7890; M; 9/25/1992 | + - |
| Nebraska Dermatology; 22; Bill Johns, Jr; 467 Mercer Street; 828-456-7890; M; 9/25/1982 | + - |

711 → (Sisters of Mercy ED row)
712 → (Nebraska Dermatology row)

FIG. 7F

DATABASE CONSOLIDATION MANAGEMENT PLATFORM

Existing IdentitySpecs

*Records with no SpecID* 800

| Record | |
|---|---|
| United Healthcare; 15; Sarah Newman; 234 First Avenue; 646-456-7440; F; 6/28/1974 | + |
| Nebraska Dermatology; 17; Sarah M. Newman; 234 1st Ave; 646-456-7440; F; 6/28/1974 | + |
| Pain in the Back Chiropracty; 49; Sarah Neuman; 253 Mercer Street; 518-456-7890; F; 4/25/1994 | + |
| Sisters of Mercy ED; 41; S. M. Newman; 234 First Ave; 646-456-7440; F; 6/28/1974 | + |
| United Health Care; 66; Sara Neuman; 253 Second Avenue; 855-123-4567; F; 4/25/1954 | + |
| Georgia Heart Specialists; Sarah Newman; 234 First Avenue; 646-456-7440; F; 6/28/1974 | + |
| St. Patrick ER; 22; Sarah Newman; 234 First Avenue; 646-456-7440; F; 6/28/1974 | |

DATABASE CONSOLIDATION MANAGEMENT PLATFORM

Existing *IdentitySpecs*

IdentitySpec101
specID: 54366 ← 811

Records with no SpecID — 850

| Record | |
|---|---|
| St. Patrick ER; 22; Sarah Newman; 234 First Avenue; 646-456-7440; F; 6/28/1974 | +/− |
| United Healthcare; 15; Sarah Newman; 234 First Avenue; 646-456-7440; F; 6/28/1974 | +/− |
| Nebraska Dermatology; 17; Sarah M. Newman; 234 1st Ave; 646-456-7440; F; 6/28/1974 | +/− |
| Pain in the Back Chiropracty; 49; Sarah Neuman; 253 Mercer Street; 518-456-7890; F; 4/25/1994 | +/− |
| Sisters of Mercy ED; 41; S. M. Newman; 234 First Ave; 646-456-7440; F; 6/28/1974 | +/− |
| United Health Care; 66; Sara Neuman; 253 Second Avenue; 855-123-4567; F; 4/25/1954 | +/− |
| Georgia Heart Specialists; Sarah Newman; 234 First Avenue; 646-456-7440; F; 6/28/1974 | +/− |

FIG. 8B recordID: (Sisters of Mercy East, 12)
specID: 13434
excludedBy: {}

1200 recordID: (United Healthcare, 12)

specID: {} excludedBy: {13434, 32426}

FIG. 12

DATABASE MANAGEMENT SYSTEMS USING HIERARCHICALLY-ENFORCED DATABASE ASSOCIATION METADATA

BACKGROUND

Various embodiments of the present invention address technical challenges related to performing efficient and effective execution of database management operations.

BRIEF SUMMARY

In general, various embodiments of the present invention provide methods, apparatuses, systems, computing devices, computing entities, and/or the like for facilitating efficient and effective execution of database management operations.

For example, various embodiments of the present invention describe generating data associated with a database association management platform that enables an end user to generate/maintain database association metadata for a database using a sequence of record relationship instructions, such as a sequence comprising at least one of record-structure inclusion (RSI) instructions, record-structure exclusion (RSE) instructions, record-structure non-inclusion (RSNI) instructions, record-structure non-exclusion (RSEI) instructions, and new structure creation (NSC) instructions.

As another example, various embodiments of the present invention enable hierarchical database record aggregation/matching using hierarchically-enforced database association metadata, for example by defining hierarchically-differentiated tiers of a cross-record matching logic, for example by defining a superseding/referential hierarchical matching logic that may be generated based at least in part on manually-entered record relationship instructions as reflected in the database association metadata, where this superseding/referential hierarchical matching logic is enforced in a manner that causes any automated matching logic to conform to the superseding/referential hierarchical matching logic described by the database association metadata.

In accordance with one aspect, a method includes: identifying a plurality of associated meta-record data structures for the database, wherein: (i) the plurality of associated meta-record data structures are associated with the plurality of included record sets and a plurality of excluded record sets, (ii) each associated meta-record data structure is associated with a respective included record set that is disjoint from: (a) a respective excluded record set for the associated meta-record data structure, and (b) each other included record set of the plurality of included record sets, and (iii) the group of database records comprises: (a) a covered record set that comprises each database record that is part of one included record set, and (b) an uncovered record set that comprises each database record that is not part of any of the plurality of included record sets; providing access to a database association management platform that enables an end user to sequentially update the database association metadata via providing a sequence of record relationship instructions, wherein: (i) the sequence of record relationship instructions comprises a record-data structure inclusion (RSI) instruction that affirms existence of a cross-record association relationship between an RSI database record and an RSI associated meta-record data structure, and (ii) the database association management platform enables the end user to provide the RSI instruction by selecting the RSI associated meta-record data structure from the plurality of associated meta-record data structures and selecting the RSI database record from database records that are in the uncovered record set and that are not in the excluded record set for the RSI associated meta-record data structure; subsequent to receiving each record relationship instruction in the sequence, updating the database association metadata based at least in part on the record relationship instruction, wherein updating the database association metadata based at least in part on the RSI instruction comprises updating the respective included record set for the RSI associated meta-record data structure to add the RSI database record; and subsequent to receiving the sequence, providing access to the database association metadata, wherein the database association metadata can be used to perform one or more database management operations with respect to the database.

In accordance with another aspect, an apparatus comprising at least one processor and at least one memory including program code, the at least one memory and the program code configured to, with the processor, cause the apparatus to at least: identify a plurality of associated meta-record data structures for the database, wherein: (i) the plurality of associated meta-record data structures are associated with the plurality of included record sets and a plurality of excluded record sets, (ii) each associated meta-record data structure is associated with a respective included record set that is disjoint from: (a) a respective excluded record set for the associated meta-record data structure, and (b) each other included record set of the plurality of included record sets, and (iii) the group of database records comprises: (a) a covered record set that comprises each database record that is part of one included record set, and (b) an uncovered record set that comprises each database record that is not part of any of the plurality of included record sets; provide access to a database association management platform that enables an end user to sequentially update the database association metadata via providing a sequence of record relationship instructions, wherein: (i) the sequence of record relationship instructions comprises a record-data structure inclusion (RSI) instruction that affirms existence of a cross-record association relationship between an RSI database record and an RSI associated meta-record data structure, and (ii) the database association management platform enables the end user to provide the RSI instruction by selecting the RSI associated meta-record data structure from the plurality of associated meta-record data structures and selecting the RSI database record from database records that are in the uncovered record set and that are not in the excluded record set for the RSI associated meta-record data structure; subsequent to receiving each record relationship instruction in the sequence, update the database association metadata based at least in part on the record relationship instruction, wherein updating the database association metadata based at least in part on the RSI instruction comprises updating the respective included record set for the RSI associated meta-record data structure to add the RSI database record; and subsequent to receiving the sequence, provide access to the database association metadata, wherein the database association metadata can be used to perform one or more database management operations with respect to the database.

In accordance with yet another aspect, a computer program product comprising at least one non-transitory computer-readable storage medium having computer-readable program code portions stored therein, the computer-readable program code portions configured to: identify a segmentation-based hashing model, wherein the segmentation-based hashing model is configured to: identify a plurality of associated meta-record data structures for the database, wherein: (i) the plurality of associated meta-record data structures are associated with the plurality of included record sets and a plurality of excluded record sets, (ii) each associated meta-record data structure is associated with a respective included record set that is disjoint from: (a) a respective excluded record set for the associated meta-record data structure, and (b) each other included record set of the plurality of included record sets, and (iii) the group of database records comprises: (a) a covered record set that comprises each database record that is part of one included record set, and (b) an uncovered record set that comprises each database record that is not part of any of the plurality of included record sets; provide access to a database association management platform that enables an end user to sequentially update the database association metadata via providing a sequence of record relationship instructions, wherein: (i) the sequence of record relationship instructions comprises a record-data structure inclusion (RSI) instruction that affirms existence of a cross-record association relationship between an RSI database record and an RSI associated meta-record data structure, and (ii) the database association management platform enables the end user to provide the RSI instruction by selecting the RSI associated meta-record data structure from the plurality of associated meta-record data structures and selecting the RSI database record from database records that are in the uncovered record set and that are not in the excluded record set for the RSI associated meta-record data structure; subsequent to receiving each record relationship instruction in the sequence, update the database association metadata based at least in part on the record relationship instruction, wherein updating the database association metadata based at least in part on the RSI instruction comprises updating the respective included record set for the RSI associated meta-record data structure to add the RSI database record; and subsequent to receiving the sequence, provide access to the database association metadata, wherein the database association metadata can be used to perform one or more database management operations with respect to the database.

BRIEF DESCRIPTION OF THE DRAWINGS

Figure 1:
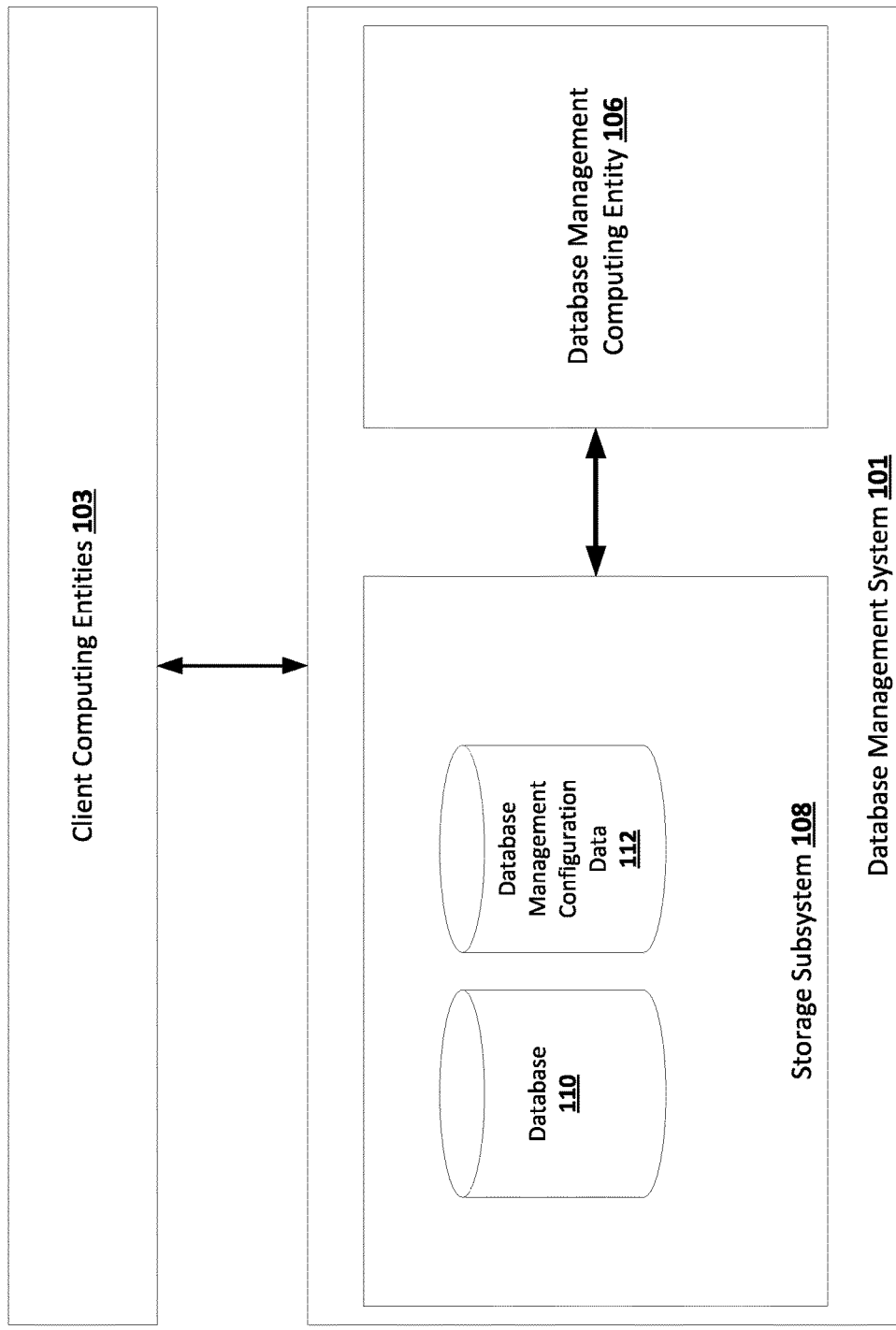

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
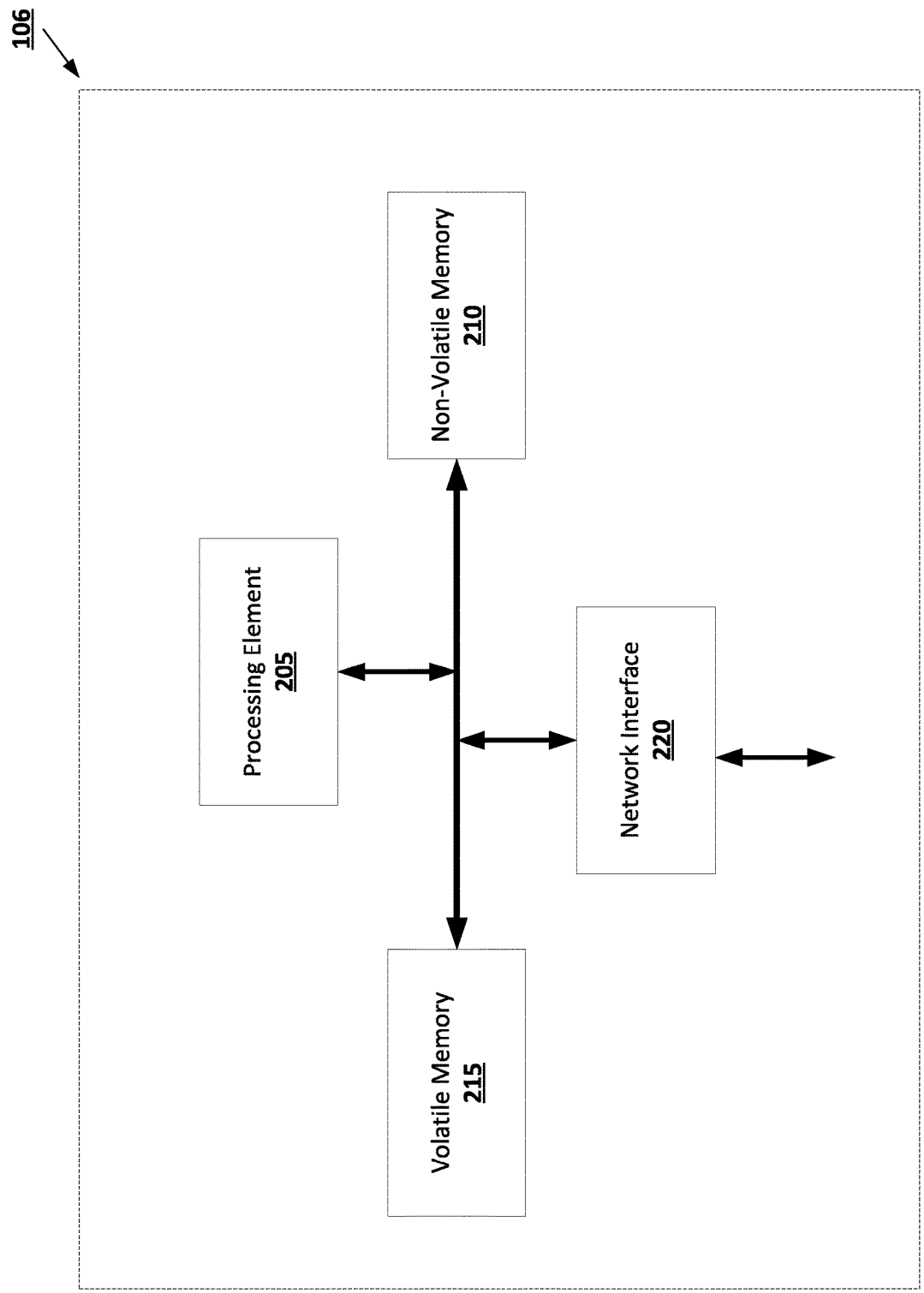

FIG. 2 provides an example database management computing entity in accordance with some embodiments discussed herein.

Figure 3:
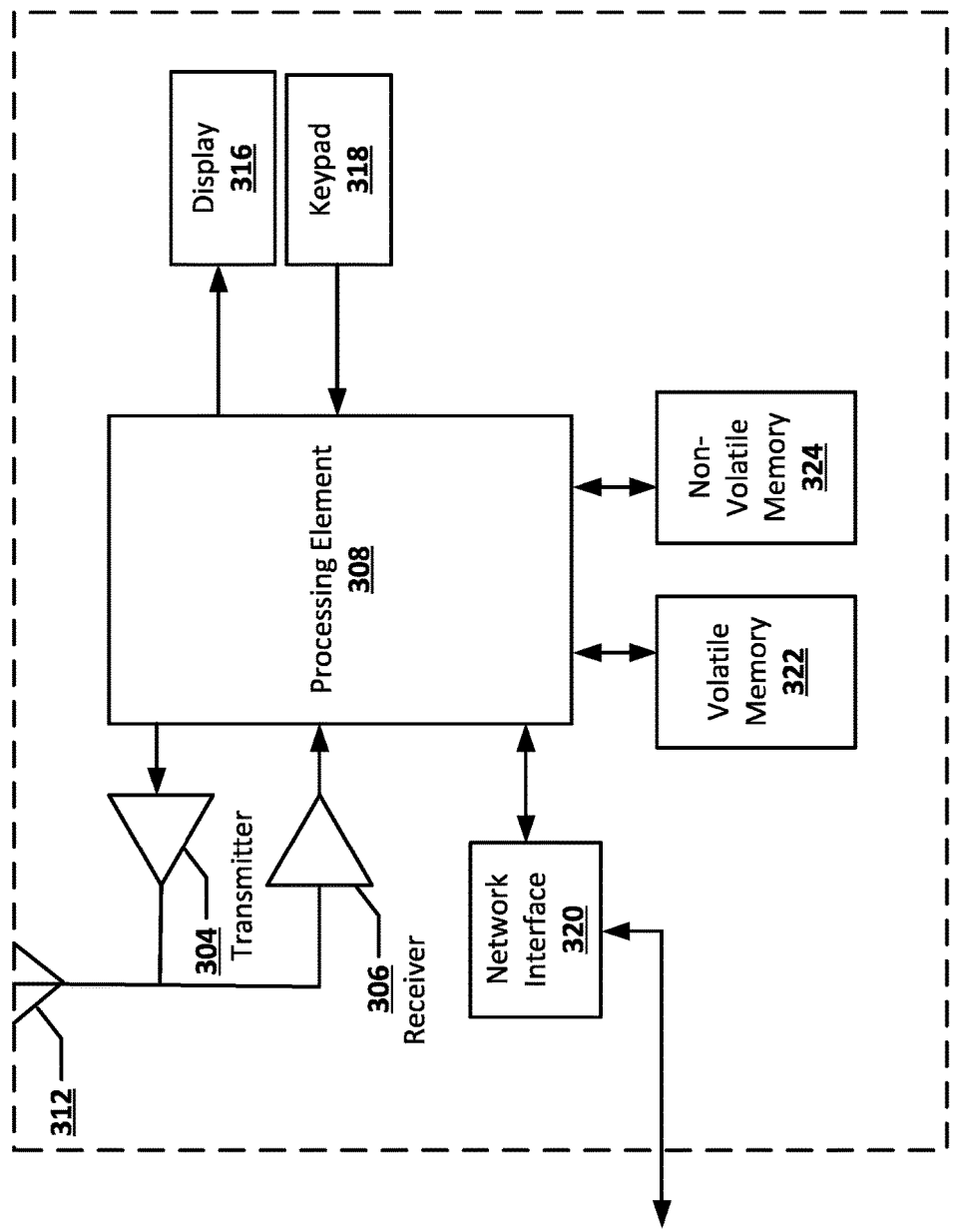

FIG. 3 provides an example client computing entity in accordance with some embodiments discussed herein.

Figure 4:
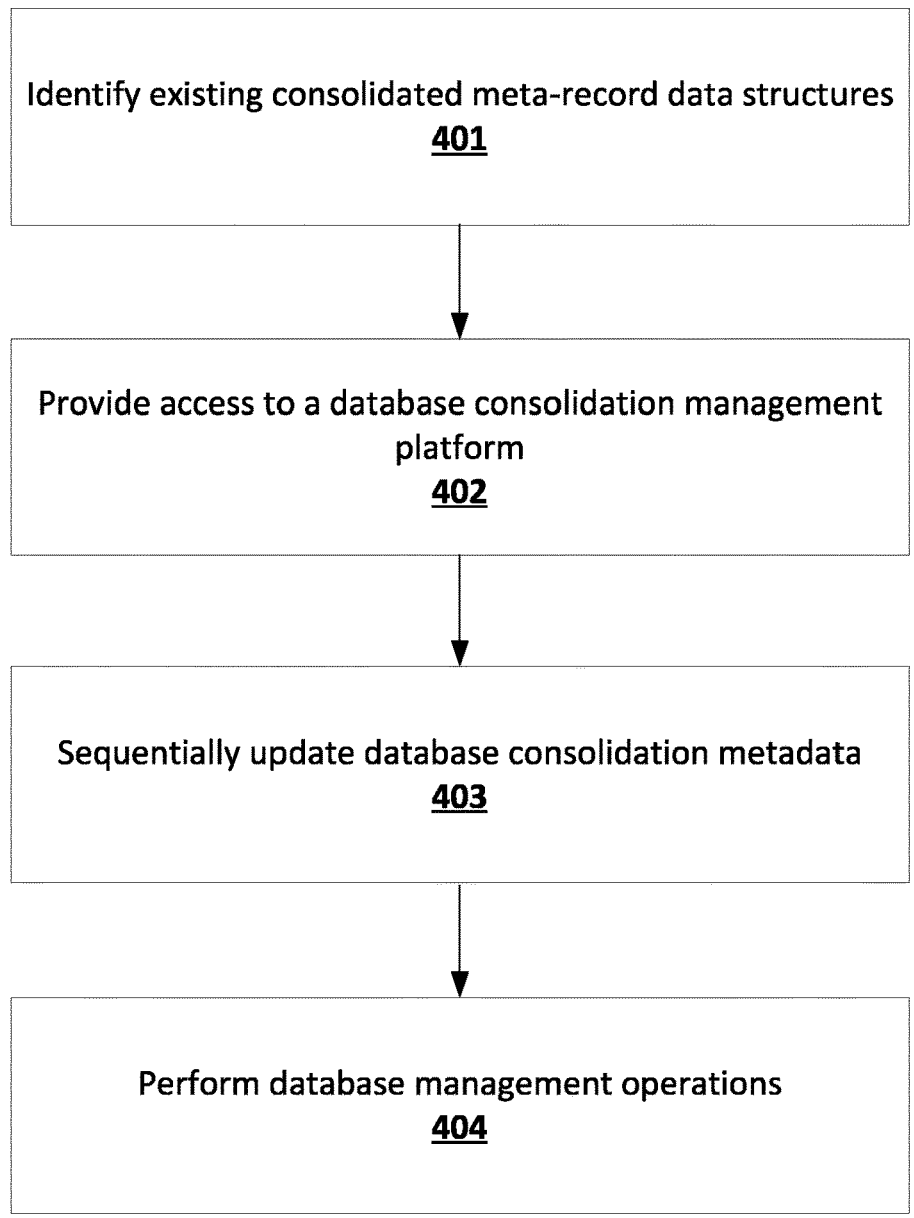

FIG. 4 is a flowchart diagram of an example process for generating/updating database association metadata for a database in accordance with some embodiments discussed herein.

FIG. 5 provides an operational example of a group of database records in accordance with some embodiments discussed herein.

FIG. 6 provides an operational example of an associated meta-record data structure in accordance with some embodiments discussed herein.

FIGS. 7A-7F provide operational example of various states of a database association management platform in accordance with some embodiments discussed herein.

FIGS. 8A-8B provide an operational example of generating a new record creation (NRC) instruction in accordance with some embodiments discussed herein.

Figure 9:

FIG. 9 provides an operational example of a database query result user interface in accordance with some embodiments discussed herein.

Figure 10:
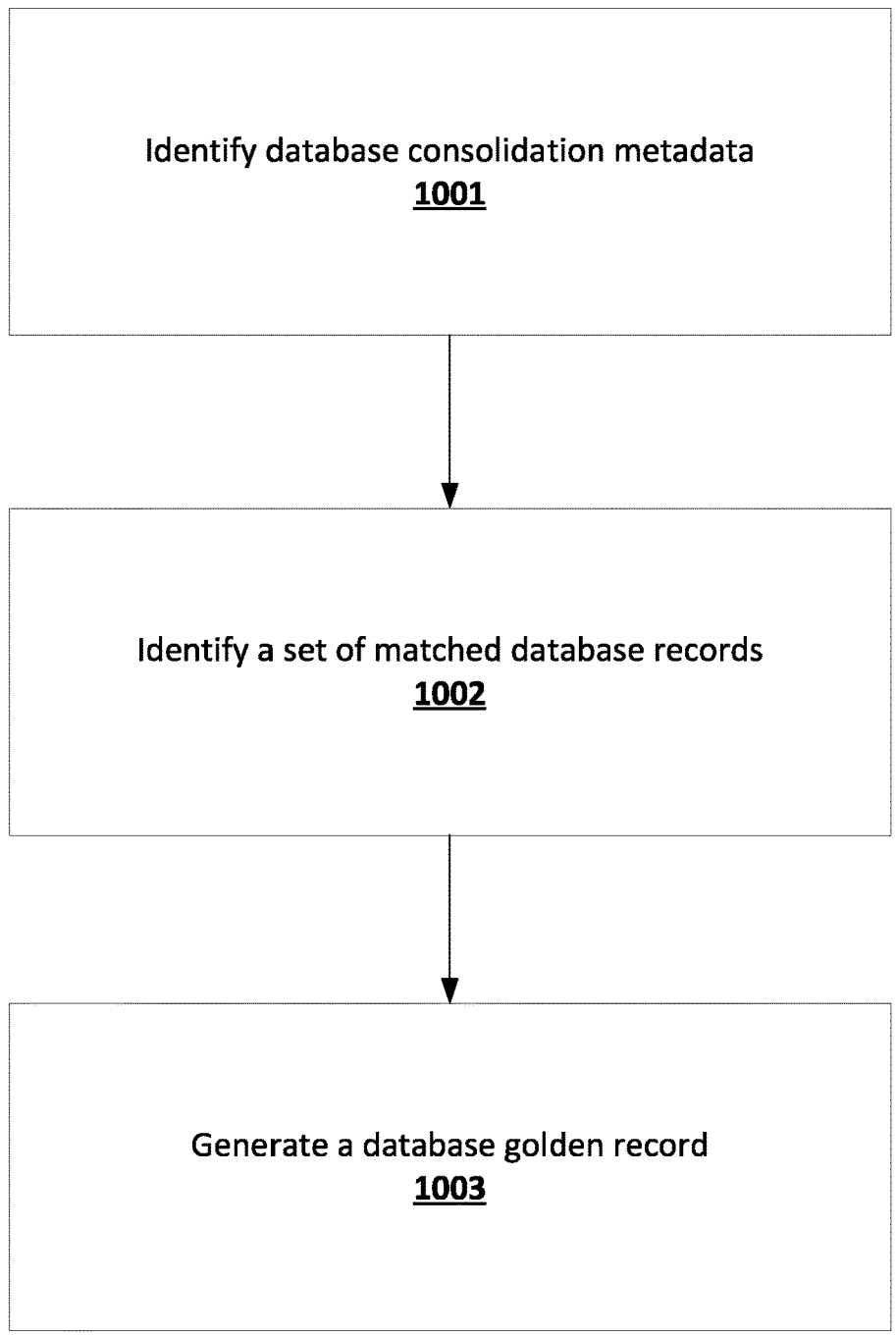

FIG. 10 is a flowchart diagram of an example process for generating/updating database aggregation metadata for a database in accordance with some embodiments discussed herein.

Figure 11:

FIGS. 11-12 provide operational examples of per-aggregate association data structures that may be described by database association metadata for a database in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention describe techniques that enable efficient and reliable execution of database management operations by enabling an end user to generate/update database association metadata for a database via providing record relationship instructions using a database association management platform. In some embodiments, an end user may provide record relationship instructions that modify database association metadata for a database, where the database association metadata describes a set of associated meta-record data structures whose structure and record associations are governed by a set of data association integrity rules enforced by the database management platform. By guiding end users to provide record relationship instructions in a manner that is consistent with an acceptable state of the database association data as determined in accordance with the data association integrity rules, the database association management platform enables using valuable user-provided guidance to perform effective cross-record association without allowing for potential data integrity issues that are often associated with directly-provided user instructions. Because user-provided instructions provide valuable guidance/requirements for automated cross-record association operations performed by database management systems without allowing for potential data integrity issues, the noted techniques improve efficiency and reliability of database management operations by reducing the need for frequent execution of the noted database management operations. In this way, various embodiments of the present invention make important technical contributions to the field of database systems by enabling efficient and reliable execution of database management operations.

Various embodiments of the present invention describe techniques that enable efficient and reliable execution of database record aggregation operations that are configured to generate database aggregates each associated with a set of records having a golden identifier. In some embodiments, a database is associated with (database aggregates, where each database aggregate comprises a subset of the database records of the database that are determined (e.g., using one or more automated matching routines) to be sufficiently related in accordance with the parameters/requirements of a cross-record aggregation relationship logic. In some of the noted embodiments, once the G database aggregates are identified/retrieved/received/generated, the G database aggregates are partitioned into single database records and the database records, now individually grouped, are matched again to create sets of matched database records. Then, the sets of matched database records can be used to generate new database aggregates and update the database aggregation metadata. Importantly, this subsequent aggregation may in some embodiments be performed using a cross-record matching routine that ensures all generated database aggregates respect the cross-record associated relationships described by the database association metadata, and thus the database association metadata maintains a superseding/referential matching significance relative to any other cross-record matching determinations (e.g., any other cross-record automated matching determinations) performed in relation to the database records of the corresponding database. In this way, various embodiments of the present invention enable hierarchical database record aggregation/matching by defining hierarchically-differentiated tiers of a cross-record matching logic, for example by defining a superseding/referential hierarchical matching logic that may be generated based at least in part on manually-entered record relationship instructions as reflected in the database association metadata, where this superseding/referential hierarchical matching logic is enforced in a manner that causes any automated matching logic to conform to superseding/referential hierarchical matching logic described by the database association metadata. In this way, various embodiments of the present invention improve efficiency and reliability of execution of database record aggregation operations that are configured to generate database aggregates each associated with a set of records having a golden identifier. In this way, various embodiments of the present invention make important technical contributions to the field of database systems by enabling efficient and reliable execution of database management operations directed to generating database aggregates.

II. Definitions of Certain Terms

The term "database" may refer to a data construct that is configured to describe a collection of one or more structured data values that are stored in accordance with one or more data models. Examples of databases include a collection of one or more structured data values, such as one or more structured data values stored in accordance with a relational data model, one or more structured data values stored in accordance with an object-oriented data model, one or more structured data values stored in accordance with an object-relational data model, one or more structured data values stored in accordance with a hierarchical data model, one or more structured data values stored in accordance with a graph-based data model, and/or the like. In some embodiments, the structured data values of a database are stored on one computing entity. In some embodiments, the structured data values of a database are stored on multiple computing entities.

The term "associated meta-record data structure" may refer to a data construct that describes a respective included record set and a respective excluded record set. The included record set for an associated meta-record data structure describes a subset of the database records of a corresponding database that are determined to have an affirmed cross-record association relationship with each other. The excluded record set for an associated meta-record data structure describes a subset of the database records of a corresponding database that are determined to have a rejected cross-record association relationship with the database records that are in the included record set for the associated meta-record data structure. Accordingly, given a group of database records of a database, the group can be divided into three disjoint sets in relation to a particular associated meta-record data structure: those database records whose collective cross-database association relationship is affirmed and are thus included in the included record set for the associated meta-record data structure, those database records whose cross-database association relationship with the database records in the included record set is rejected and are thus included in the excluded record set for the associated meta-record data structure, and those database records whose cross-database association relationship is neither affirmed nor rejected and are thus neither included in the included record set for the particular associated meta-record data structure nor included in the excluded record set for the particular associated meta-record data structure. In some embodiments, an associated meta-record data structure is associated with: (i) an included record set, (ii) an excluded record set, (iii) a unique associated meta-record data structure identifier, and (iv) a latest modification timestamp (e.g., a timestamp associated with a latest date/time at which at least one of the included record set or the excluded record set for the associated meta-record data structure was modified). In some embodiments, the associated meta-record data structures for a database are stored as part of the database association metadata for the database.

The term "cross-record association relationship" may refer to a data construct that describes parameters and/or requirements of a user-defined relationship that, when the existence of the relationship is affirmed between two or more database records, those database records are assigned to a common included record set of a respective associated meta-record data structure that is associated with the cross-record association relationship. The semantic meaning of cross-record association relationship may be defined by configuration metadata associated with a database management system. For example, in some embodiments, end users may be instructed by the database management system to assign database records to a common included record set if those database records are confirmed to be related to a common person/entity (i.e., if the database records are deemed to satisfy an identity relationship). In this example, the included record set for a particular associated meta-record data structure may describe a set of database records that are confirmed to be related to a common person/entity, and the excluded record set for the particular associated meta-record data structure may describe a set of database records that are confirmed to be unrelated to the common person/entity. As another example, in some embodiments, end users may be instructed by the database management system to assign database records to a common included record set if the database records are determined to be conceptually related. In this example, the included record set for a particular associated meta-record data structure may describe a set of database records that are confirmed to be conceptually related, and the excluded record set for the particular associated meta-record data structure may describe a set of database records that are confirmed to be conceptually unrelated to the database records in the included record set for the particular associated meta-record data structure.

The term "database association management platform" may refer to a data construct that describes a user interface platform characterized by a set of user interfaces, where the user interface platform enables an end user to modify/update the database association metadata associated with a database. As described above, the database association metadata for the database describes, at least in part, a set of associated meta-record data structures that are associated with the database. Therefore, in some embodiments, the database association management platform may enable an end user to perform at least one of: (i) generating new associated meta-record data structures for the database, (ii) adding database records into the included record set of an existing associated meta-record data structure, (iii) removing database records from the included record set of an existing associated meta-record data structure, (iv) adding database records into the excluded record set of an existing associated meta-record data structure, and (v) removing database records from the excluded record set of an existing associated meta-record data structure. Accordingly, the database association management platform may enable end users to add, remove, or modify associated meta-record data structures. As described above, in some embodiments, the database association management platform enables an end user to provide record relationship instructions, where each record relationship instruction may be an end-user-provided instruction to modify a latest state of the associated meta-record data structures of a database as described by the database association metadata for the database via affirming, revoking affirmation of, rejecting, or revoking rejection of cross-record association relationships between database records. Examples of record relationship instructions include record-structure inclusion (RSI) instructions, record-structure exclusion (RSE) instructions, record-structure non-inclusion (RSNI) instructions, record-structure non-exclusion (RSEI) instructions, and new structure creation (NSC) instructions.

The term "record relationship instruction" may refer to a data construct that describes an end-user-provided instruction to modify a latest state of the associated meta-record data structures of a database as described by the database association metadata for the database via affirming, revoking affirmation of, rejecting, or revoking rejection of cross-record association relationships between database records. Examples of record relationship instructions include record-structure inclusion (RSI) instructions, record-structure exclusion (RSE) instructions, record-structure non-inclusion (RSNI) instructions, record-structure non-exclusion (RSEI) instructions, and new structure creation (NSC) instructions.

The term "record-structure inclusion (RSI) instruction" may refer to a data construct that describes a user-generated instruction to add a database record, referred to herein as an RSI record, to an associated meta-record data structure, referred to herein as an RSI associated meta-record data structure. In some embodiments, the RSI instruction affirms existence of a cross-record association relationship between an RSI database record and an RSI associated meta-record data structure. In some embodiments, the RSI database record must, prior to the execution of database association metadata update operations corresponding to the RSI instruction, be part of the uncovered record set for a corresponding database (i.e., the RSI record must, prior to the execution of database association metadata update operations corresponding to the RSI instruction, not be a member of the included record set for any existing associated meta-record data structure). In some embodiments, the RSI database record must, prior to the execution of database association metadata update operations corresponding to the RSI instruction, not be part of the excluded record set for the RSI associated meta-record data structure. Accordingly, in some embodiments, the database association management platform is configured to enable an end user to provide an RSI instruction by selecting an RSI database record from at least a subset of the uncovered record set for a corresponding database (e.g., from those database records that are in the uncovered record set for the corresponding database and that are not in the excluded record set for the RSI associated meta-record data structure) and selecting an RSI associated meta-record data structure from the set of associated meta-record data structures associated with the corresponding database.

The term "record-structure exclusion (RSE) instruction" may refer to a data construct that describes a user-generated instruction to add a database record that is not in the included record set for an associated meta-record data structure to the excluded record set for the associated meta-record data structure. The database record that is associated with an RSE instruction is referred to as the RSE database record, while the associated meta-record data structure that is associated with an RSE instruction is referred to as the RSE associated meta-record data structure. In some embodiments, an RSE instruction rejects existence of a cross-record association relationship between an RSE database record and an RSE associated meta-record data structure. In some embodiments, the RSE data record must, prior to execution of database association metadata update operations corresponding to the RSE instruction, be part of the non-associated record set for the RSE associated meta-record data structure. In some embodiments, the database association management platform ensures/enforces that the RSE database record associated with an RSE instruction is selected from the non-associated record set for the RSE associated meta-record data structure that is associated with the RSE instruction. In some embodiments, the database association management platform enables an end user to provide the RSE instruction by selecting the RSE associated meta-record data structure from the set of associated meta-record data structures of a corresponding database and selecting the RSI database record from the non-associated record set for the RSE associated meta-record data structure.

The term "record-structure non-inclusion (RSNI) instruction" may refer to a data construct that describes a user-generated instruction to remove a database record that is in the included record set for a particular associated meta-record data structure from the included record set for the particular associated meta-record data structure. The database record that is associated with an RSNI instruction is referred to as an RSNI database record, while the associated meta-record data structure that is associated with an RSNI instruction is referred to as an RSNI associated meta-record data structure. In some embodiments, the RSNI instruction revokes affirmation of existence of a cross-record association relationship between an RSNI database record and an RSNI associated meta-record data structure whose respective included record set comprises the RSNI database record. In some embodiments, the RSNI database record for an RSNI instruction must, prior to the execution of database association metadata update operations corresponding to the RSNI instruction, be part of the included record set for the RSNI associated meta-record data structure. In some embodiments, the database association management platform enables an end user to provide the RSNI instruction by selecting the RSNI associated meta-record data structure from the set of associated meta-record data structures of a corresponding database and selecting the RSNI database record from the respective included record set for the RSNI associated meta-record data structure.

The term "record-structure non-exclusion (RSEI) instruction" may refer to a data construct that describes a user-generated instruction to remove a database record that is in the excluded record set for a particular associated meta-record data structure from the excluded record set for the particular associated meta-record data structure. The database record that is associated with an RSEI instruction is referred to as an RSEI database record, while the associated meta-record data structure that is associated with an RSEI instruction is referred to as an RSEI associated meta-record data structure. In some embodiments, the RSEI instruction revokes rejection of existence of a cross-record association relationship between an RSEI database record and an RSEI associated meta-record data structure whose respective excluded record set comprises the RSEI database record. In some embodiments, the RSEI database record for an RSEI instruction must, prior to the execution of database association metadata update operations corresponding to the RSEI instruction, be part of the excluded record set for the RSEI associated meta-record data structure. In some embodiments, the database association management platform enables an end user to provide the RSEI instruction by selecting the RSEI associated meta-record data structure from the set of associated meta-record data structures of a corresponding database and selecting the RSEI database record from the respective excluded record set for the RSEI associated meta-record data structure.

The term "new record creation (NRC) instruction" may refer to a data construct that describes a user-generated instruction to assign a database record that is in the uncovered record set for a corresponding database as the first database record in the included record set of a newly-generated associated meta-record data structure. The database record that is associated with an NRC instruction is referred to as an NRC database record and the newly-generated associated meta-record data structure that is associated with an NRC instruction is referred to as an NRC associated meta-record data structure. In some embodiments, the NRC database record must, prior to the execution of database association metadata update operations corresponding to the NRC instruction, be part of the uncovered record set for the corresponding database. In some embodiments, the database association management platform enables an end user to provide the NRC instruction by selecting the NRC database record from the uncovered record set for the corresponding database.

The term "database association metadata" may refer to a data construct that describes a set of associated meta-record data structures associated with a corresponding database. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set and the excluded record set for the associated meta-record data structure. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set, the excluded record set, the unique identifier, and/or the last modification timestamp for the associated meta-record data structure. In some embodiments, the database association metadata comprises, for each database aggregate of a corresponding database, a per-aggregate association data structure (e.g., a struct data structure, an object data structure, an array data structure, a linked list data structure, and/or the like) that describes at least one of: (i) if a database record of the database aggregate is part of the included record set of an associated meta-record data structure, the unique identifier of the associated meta-record data structure, or (ii) if a database record of the database aggregate is part of the excluded record set of one or more associated meta-record data structures, unique identifiers of the one or more associated meta-record data structures. In some embodiments, each database aggregate is associated with up to one included associated meta-record data structure, but some database aggregates may be (and typically are) associated with no included associated meta-record data structures. Accordingly, the use of the term per-aggregate association data structures should not be read to imply that all database aggregates have one included associated meta-record data structure.

The term "database aggregate" may refer to a data construct that describes a set of database records that are assigned a golden identifier and are processed as matched database records by a database management system. In some embodiments, the database records of a database are matched (e.g., using one or more automated matching routines) in order to identify/detect cross-record aggregation relationships between sets of the database records and assign each identified set comprising database records that are determined to collectively have a cross-record aggregation relationship to a database aggregate. The database aggregates of a database may be described by the database aggregation metadata for the database, where the database aggregation metadata for a database may be used to perform one or more database management operations with respect to the database. In some embodiments, given a set of matched database records that comprises M matched database records, where the M matched database records are in the included record sets for X associated meta-record data structures of the database as described by the database association metadata, a database aggregate is associated with the each matched database record of the M matched database records that is not in any of the X excluded record sets for the X associated meta-record data structures. For example, consider an operational example in which a set of matched record sets generated by an automated matching routine comprises database records R1, R2, R3, R4, and R5 (accordingly, M=5). In this operational example, if the corresponding database is associated with two associated meta-record data structures including a first associated meta-record data structure whose included record set comprises R1 and whose excluded record set comprises R3 as well as a second associated meta-record data structure whose included record set comprises R2 and whose excluded record set comprises R4, then: (i) the set of M=5 database records is associated with X=2 associated meta-record data structures comprising the first associated meta-record data structure and the second associated meta-record data structure (as both associated meta-record data structures have an included record set that comprises at least one matched database record in the set of M=5 database records, and (ii) because R2 is in the excluded record set for the first associated meta-record data structure and R4 is in the excluded record set for the second associated meta-record data structure, those two database records are excluded from the filtered match record subset and thus the resulting database aggregate is only associated with R1, R3, and R5.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

The system architecture 100 includes a database management system 101, one or more client computing entities 103, and one or more client computing entities 103. The database management system 101 may be configured to receive database management requests (e.g., database retrieval requests, database modification requests, database configuration management requests, and/or the like) from the client computing entities 103, perform database management operations (e.g., database retrieval operations, database modification operations, database configuration management operations, and/or the like) in response to the database management requests, and optionally transmit any result data generated by the database management operations to the client computing entities 103. To perform the database management operations, the database management system 101 may maintain and update metadata associated with a database 110, by for example consolidating and/or aggregating the database records of the database 110 via communicating with the client computing entities 103 and using the database update management techniques described herein.

The database management system 101 may comprise a database management computing entity 106 and a storage subsystem 108. The database management computing entity 106 may be configured to receive database management requests (e.g., database retrieval requests, database modification requests, database configuration management requests, and/or the like) from the client computing entities 103, perform database management operations (e.g., database retrieval operations, database modification operations, database configuration management operations, and/or the like) in response to the database management requests, and optionally transmit any result data generated by the database management operations to the client computing entities 103. To perform the database management operations, the database management computing entity 106 may maintain and update metadata associated with a database 110, by for example consolidating and/or aggregating the database records of the database 110 via communicating with the client computing entities 103 and using the database update management techniques described herein.

The storage subsystem 108 may store a database 110 and configuration data 112 used by the database management computing entity 106 to perform various database management operations with respect to the database 110. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Examples of configuration data 112 include database aggregation metadata describing one or more database aggregates of the database 110, database association metadata describing one or more associated meta-record data structures of the database 110, and/or the like. In some embodiments, the configuration data 112 describes a set of associated meta-record data structures associated with a corresponding database. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set and the excluded record set for the associated meta-record data structure. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set, the excluded record set, the unique identifier, and/or the last modification timestamp for the associated meta-record data structure. In some embodiments, the database association metadata comprises, for each database aggregate of a corresponding database, a per-aggregate association data structure (e.g., a struct data structure, an object data structure, an array data structure, a linked list data structure, and/or the like) that describes at least one of: (i) if a database record of the database aggregate is part of the included record set of an associated meta-record data structure, the unique identifier of the associated meta-record data structure, or (ii) if a database record of the database aggregate is part of the excluded record set of one or more associated meta-record data structures, unique identifiers of the one or more associated meta-record data structures.

A. Exemplary Database Management Computing Entity

FIG. 2 provides a schematic of a database management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing entity 106 may include or be in communication with a processing element 205 (also referred to as processors, processing circuitry, and/or similar terms used herein interchangeably) that communicate with other elements within the database management computing entity 106 via a bus, for example. As will be understood, the processing element 205 may be embodied in a number of different ways. For example, in some embodiments, the processing element 205 may be part of one or more processing elements, such as one or more processing elements that may perform operations in a parallel manner.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the database management computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing entity 106 with the assistance of the processing element 205 and operating system.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing entity 106 may include or be in communication with one or more input elements, such as a keyboard input, a mouse input, a touch screen/display input, motion input, movement input, audio input, pointing device input, joystick input, keypad input, and/or the like. The database management computing entity 106 may also include or be in communication with one or more output elements (not shown), such as audio output, video output, screen/display output, motion output, movement output, and/or the like.

B. Exemplary Client Computing Entity

FIG. 3 provides an illustrative schematic representative of a client computing entity 103 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 103 can be operated by various parties. As shown in FIG. 3, the client computing entity 103 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 103 may be capable of operating with one or more air interface standards, communication protocols, modulation types, and access types. More particularly, the client computing entity 103 may operate in accordance with any of a number of wireless communication standards and protocols, such as those described above with regard to the database management computing entity 106. In a particular embodiment, the client computing entity 103 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 103 may operate in accordance with multiple wired communication standards and protocols, such as those described above with regard to the database management computing entity 106 via a network interface 320.

Via these communication standards and protocols, the client computing entity 103 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 103 can also download changes, add-ons, and updates, for instance, to its firmware, software (e.g., including executable instructions, applications, program modules), and operating system.

According to one embodiment, the client computing entity 103 may include location determining aspects, devices, modules, functionalities, and/or similar words used herein interchangeably. For example, the client computing entity 103 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal-Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 103 position in connection with a variety of other systems, including cellular towers, Wi-Fi access points, and/or the like. Similarly, the client computing entity 103 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 103 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 103 to interact with and/or cause display of information/data from the database management computing entity 106, as described herein. The user input interface can comprise any of a number of devices or interfaces allowing the client computing entity 103 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 103 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 103 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 103. As indicated, this may include a user application that is resident on the entity or accessible through a browser or other user interface for communicating with the database management computing entity 106 and/or various other computing entities.

In another embodiment, the client computing entity 103 may include one or more components or functionality that are the same or similar to those of the database management computing entity 106, as described in greater detail above. As will be recognized, these frameworks and descriptions are provided for exemplary purposes only and are not limiting to the various embodiments.

In various embodiments, the client computing entity 103 may be embodied as an artificial intelligence (AI) computing entity, such as an Amazon Echo, Amazon Echo Dot, Amazon Show, Google Home, and/or the like. Accordingly, the client computing entity 103 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described herein, various embodiments of the present invention provide methods, apparatuses, systems, computing devices, computing entities, and/or the like for facilitating efficient and effective execution of database management operations. For example, various embodiments of the present invention describe generating data associated with a database association management platform that enables an end user to generate/maintain database association metadata for a database using a sequence of record relationship instructions, such as a sequence comprising at least one of record-structure inclusion (RSI) instructions, record-structure exclusion (RSE) instructions, record-structure non-inclusion (RSNI) instructions, record-structure non-exclusion (RSEI) instructions, and new structure creation (NSC) instructions. As another example, various embodiments of the present invention enable hierarchical database record aggregation/matching by defining hierarchically-differentiated tiers of a cross-record matching logic, for example by defining a superseding/referential hierarchical matching logic that may be generated based at least in part on manually-entered record relationship instructions as reflected in the database association metadata, where this superseding/referential hierarchical matching logic is enforced in a manner that causes any automated matching logic to conform to the superseding/referential hierarchical matching logic described by the database association metadata.

This Section of the present document describes, in Subsection A, exemplary techniques for maintaining database association metadata for a database and, in Subsection B, exemplary techniques for maintaining database aggregation metadata for a database based at least in part on the database association metadata for the noted database. However, while various embodiments of the present invention describe maintaining database aggregation metadata based at least in part on database association metadata generated in accordance with the techniques described in Subsection A, a person of ordinary skill in the relevant technology will recognize that: (i) database aggregation metadata for a database may be maintained based at least in part on database association metadata generated in accordance with the techniques other than or in addition to the techniques described in Subsection A, and (ii) database association metadata for a database may be used to perform database management operations that do not involve maintaining database aggregation metadata for the database. Moreover, while various embodiments of the present invention describe that the techniques for maintaining database association metadata as described in Subsection A and the techniques for maintaining database aggregation metadata as described in Subsection B are performed by a common computing entity, a person of ordinary skill in the relevant technology will recognize that each of the noted techniques may be performed by a separate set of one or more computing entities.

A. Generating/Updating Database Association Metadata

FIG. 4 is a flowchart diagram of an example process 400 for generating/updating database association metadata for a database that is associated with a group of database records. Via the various steps/operations of the process 400, the database management computing entity 106 can enable generating and updating associated meta-record data structures for a database. However, while various embodiments of the present invention describe generating/updating database association metadata for a single database, a person of ordinary skill in the relevant technology will recognize that the techniques described herein can be performed to generate/update database association metadata for a group of two or more databases.

The process 400 begins at step/operation 401 when the database management computing entity 106 identifies (e.g., retrieves from the storage subsystem 108, receives, and/or the like) a set of existing associated meta-record data structures for the database. However, while various embodiments of the present invention describe generating/updating database association metadata in a context in which a set of associated meta-record data structures exist, a person of ordinary skill in the relevant technology will recognize that the techniques described herein can be used to generate/update database association metadata in a context in which no associated meta-record data structures are initially defined. Here, to better describe record relationship instructions that modify existing associated meta-record data structures, the existence of some associated meta-record data structures is initially assumed.

A associated meta-record data structure may refer to a data entity that describes a respective included record set and a respective excluded record set. The included record set for an associated meta-record data structure describes a subset of the database records of a corresponding database that are determined to have an affirmed cross-record association relationship with each other. The excluded record set for an associated meta-record data structure describes a subset of the database records of a corresponding database that are determined to have a rejected cross-record association relationship with the database records that are in the included record set for the associated meta-record data structure. Accordingly, given a group of database records of a database, the group can be divided into three disjoint sets in relation to a particular associated meta-record data structure: those database records whose collective cross-database association relationship is affirmed and are thus included in the included record set for the associated meta-record data structure, those database records whose cross-database association relationship with the database records in the included record set is rejected and are thus included in the excluded record set for the associated meta-record data structure, and those database records whose cross-database association relationship is neither affirmed nor rejected and are thus neither included in the included record set for the particular associated meta-record data structure nor included in the excluded record set for the particular associated meta-record data structure. In some embodiments, an associated meta-record data structure is associated with: (i) an included record set, (ii) an excluded record set, (iii) a unique associated meta-record data structure identifier, and (iv) a latest modification timestamp (e.g., a timestamp associated with a latest date/time at which at least one of the included record set or the excluded record set for the associated meta-record data structure was modified). In some embodiments, the associated meta-record data structures for a database are stored as part of the database association metadata for the database.

As described above, inclusion of database record in included record sets or excluded record sets of associated meta-record data structures depends on existence or rejection of cross-record association relationships between database records. A cross-record association relationship may be a user-defined relationship that, when the existence of the relationship is affirmed between two or more database records, those database records are assigned to a common included record set of a respective associated meta-record data structure that is associated with the cross-record association relationship. The semantic meaning of cross-record association relationship may be defined by configuration metadata associated with a database management system. For example, in some embodiments, end users may be instructed by the database management system to assign database records to a common included record set if those database records are confirmed to be related to a common person/entity (i.e., if the database records are deemed to satisfy an identity relationship). In this example, the included record set for a particular associated meta-record data structure may describe a set of database records that are confirmed to be related to a common person/entity, and the excluded record set for the particular associated meta-record data structure may describe a set of database records that are confirmed to be unrelated to the common person/entity. As another example, in some embodiments, end users may be instructed by the database management system to assign database records to a common included record set if the database records are determined to be conceptually related. In this example, the included record set for a particular associated meta-record data structure may describe a set of database records that are confirmed to be conceptually related, and the excluded record set for the particular associated meta-record data structure may describe a set of database records that are confirmed to be conceptually unrelated to the database records in the included record set for the particular associated meta-record data structure.

An operational example of generating an associated meta-record data structure is depicted in FIGS. 5-6. FIG. 5 depicts a group of database records of a database, where each database record corresponds to a row of the depicted table and can be represented by a tuple (Source, Patient ID). Suppose that an end user provides instructions to a database management system that describes that: (i) database records {(Sisters of Mercy East, 12), (Regional Clinic, 3), (Pain in the Back Chiropracty, 41), (United Health Care, 64)} are related to a particular person, and (ii) database record (United Health Care, 12) is not related to the particular person. Based at least in part on the noted record relationship instructions, the database management system may generate the associated meta-record data structure 600 that is depicted in FIG. 6. As depicted in FIG. 6, the associated meta-record data structure 600 comprises an included record set 601 that comprises the database records {(Sisters of Mercy East, 12), (Regional Clinic, 3), (Pain in the Back Chiropracty, 41), (United Health Care, 64)} and an excluded record set 602 that comprises the database record (United Health Care, 12).

In some embodiments, given a database that is associated with R database records and S associated meta-record data structures, the following data association integrity rules are enforced by a database management system when generating relationships between database records and associated meta-record data structures based at least in part on end-user-defined associations: (i) each database record can be in the included record set of at most one associated meta-record data structure, and thus no database record can be in two or more included record sets for two or more corresponding associated meta-record data structures, (ii) no database record can be in both the included record set and the excluded record set of the same associated meta-record data structure, and thus if a database record is in the included record set of a particular associated meta-record data structure, the database record cannot be added to the excluded record set of the particular associated meta-record data structure, and vice versa, and/or (iii) no particular associated meta-record data structure can have an empty included record set that comprises no database record, and thus if all of the last remaining database record in the included record set of a particular associated meta-record data structure is removed, then the particular associated meta-record data structure is also removed. In some embodiments, the excluded record set of an associated meta-record data structure is allowed to be an empty set, while the included record set of an associated meta-record data structure is not allowed to be an empty set.

In some embodiments, the three rules described above mean that each associated meta-record data structure is associated with a respective included record set that is disjoint from: (i) a respective excluded record set for the associated meta-record data structure, and (ii) the other included record set for other associated meta-record data structures of the same database. For example, given a database that is associated with two associated meta-record data structures S1 and S2: (i) the included record set of S1 is disjoint from the excluded record set of S1, (ii) the included record set of S2 is disjoint from the excluded record set of S2, and (iii) the included record set of S1 is disjoint from the included record set of S2. As another example, given a database that is associated with three associated meta-record data structures S1, S2, and S3: (i) the included record set of S1 is disjoint from the excluded record set of S1, (ii) the included record set of S2 is disjoint from the excluded record set of S2, (iii) the included record set of S3 is disjoint from the excluded record set of S3, and (iv) the included record sets of S1, S2, and S3 are disjoint from one another.

In some embodiments, the R database records of a database may be divided into two disjoint sets: a first "covered record set" that comprises those database records that are in included record sets of the S associated meta-record data structures associated with the database, and a second "uncovered record set" that comprises those database records that are not in the included record sets of the S associated meta-record data structures associated with the database. For example, consider a database that comprises five database records R1, R2, R3, R4, and R5, where: (i) the database is associated with two associated meta-record data structures S1 and S2, (ii) the included record set for S1 comprises R1 and R3, and (iii) the included record set for R2 comprises R2. In this example, the covered record set for the database comprises R1, R2, and R3, while the uncovered record set for the database comprises R4 and R5.

Returning to FIG. 4, at step/operation 402, the database management computing entity 106 provides access to a database association management platform that enables an end user to sequentially update the database association metadata for the database via providing a sequence of record relationship instructions. In some embodiments, the database association management platform enables an end user to update the database association metadata via at least one of: (i) one or more record-structure inclusion (RSI) instructions, (ii) one or more record-structure exclusion (RSE) instructions, (iii) one or more record-structure non-inclusion (RSNI) instructions, (Iv) one or more record-structure non-exclusion (RSEI) instructions, and (v) new structure creation (NSC) instructions.

In some embodiments, the database association management platform refers to a user interface platform characterized by a set of user interfaces, where the user interface platform enables an end user to modify/update the database association metadata associated with a database. As described above, the database association metadata for the database describes, at least in part, a set of associated meta-record data structures that are associated with the database. Therefore, in some embodiments, the database association management platform may enable an end user to perform at least one of: (i) generating new associated meta-record data structures for the database, (ii) adding database records into the included record set of an existing associated meta-record data structure, (iii) removing database records from the included record set of an existing associated meta-record data structure, (iv) adding database records into the excluded record set of an existing associated meta-record data structure, and (v) removing database records from the excluded record set of an existing associated meta-record data structure. Accordingly, the database association management platform may enable end users to add, remove, or modify associated meta-record data structures.

As described above, the database association management platform enables an end user to provide record relationship instructions, where each record relationship instruction may be an end-user-provided instruction to modify a latest state of the associated meta-record data structures of a database as described by the database association metadata for the database via affirming, revoking affirmation of, rejecting, or revoking rejection of cross-record association relationships between database records. Examples of record relationship instructions include record-structure inclusion (RSI) instructions, record-structure exclusion (RSE) instructions, record-structure non-inclusion (RSNI) instructions, record-structure non-exclusion (RSEI) instructions, and new structure creation (NSC) instructions.

In some embodiments, an RSI instruction is a user-generated instruction to add a database record, referred to herein as an RSI record, to an associated meta-record data structure, referred to herein as an RSI associated meta-record data structure. In some embodiments, the RSI instruction affirms existence of a cross-record association relationship between an RSI database record and an RSI associated meta-record data structure. In some embodiments, the RSI database record must, prior to the execution of database association metadata update operations corresponding to the RSI instruction, be part of the uncovered record set for a corresponding database (i.e., the RSI record must, prior to the execution of database association metadata update operations corresponding to the RSI instruction, not be a member of the included record set for any existing associated meta-record data structure). In some embodiments, the RSI database record must, prior to the execution of database association metadata update operations corresponding to the RSI instruction, not be part of the excluded record set for the RSI associated meta-record data structure. Accordingly, in some embodiments, the database association management platform is configured to enable an end user to provide an RSI instruction by selecting an RSI database record from at least a subset of the uncovered record set for a corresponding database (e.g., from those database records that are in the uncovered record set for the corresponding database and that are not in the excluded record set for the RSI associated meta-record data structure) and selecting an RSI associated meta-record data structure from the set of associated meta-record data structures associated with the corresponding database.

Figure 7A:
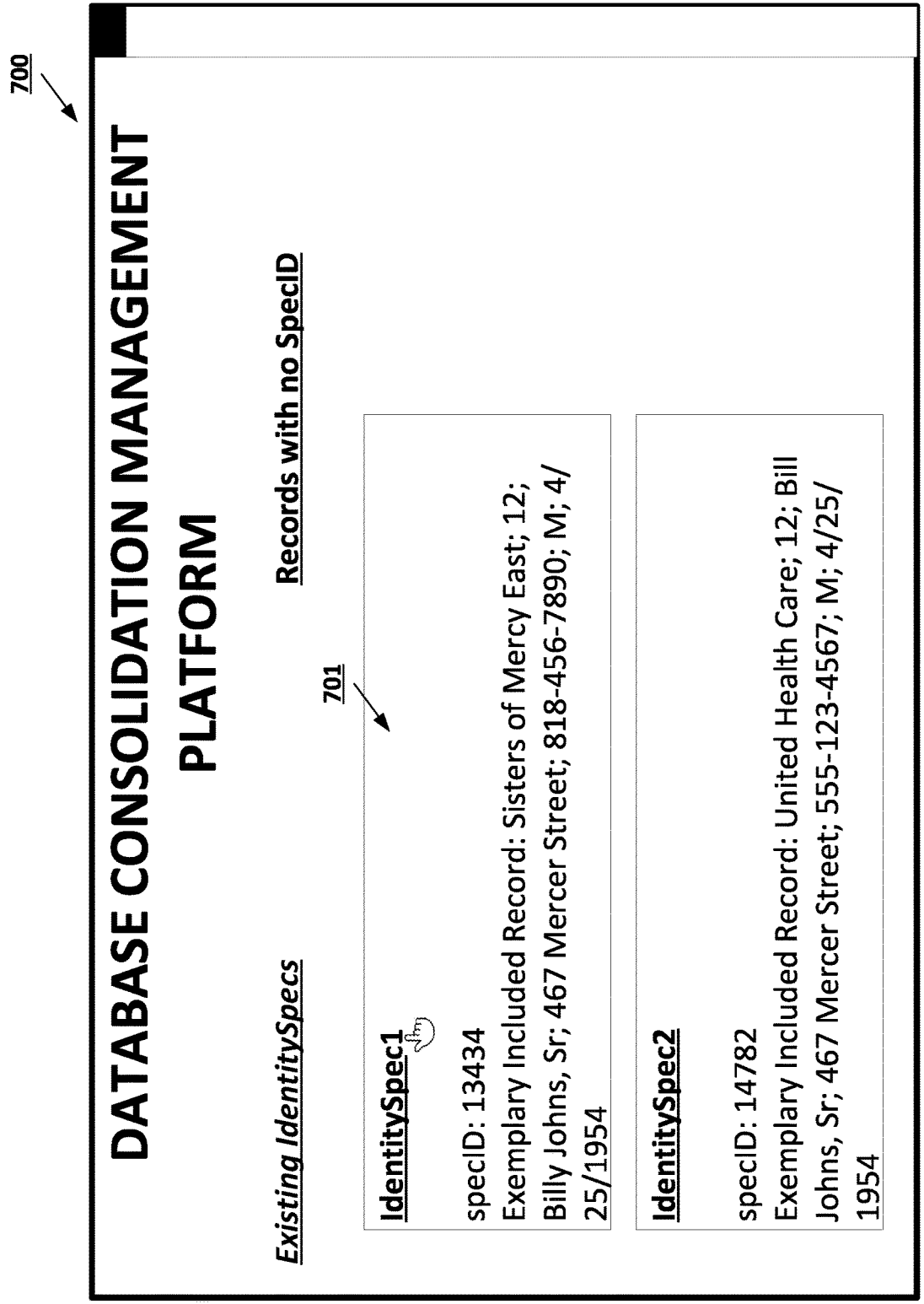

An operational example of user-performed actions that are configured to generate an RSI instruction can be described in relation to FIGS. 7A-7C. As depicted in FIG. 7A, a database association management platform 700 depicts a set of associated meta-record data structures (each referred to as an IdentitySpec), including the IdentitySpec1 701. After the user selects the IdentitySpec1 701, in FIG. 7B, the database association management platform 700 depicts a set of database records, where the set of database records include: (i) an included record set for the IdentitySpec1 701 including those database records that are associated with a highlighted (+) button, (ii) an excluded record set for the IdentitySpec1 701 including those database records that are associated with a highlighted (−) button, and (iii) a non-associated record set for the IdentitySpec1 including those database records that are associated with a non-highlighted (+) button and a non-highlighted (−) button. The non-associated record set may, for example, include at least one of: (i) database records that are determined to be related to the database records in the included record set but are not in the included record set, or (ii) database records that are determined to be related to the database records in the excluded record set but are not in the excluded record set. Given the state of the database association management platform 700 that is depicted in FIG. 7B, an end user may generate an RSI instruction by selecting the non-highlighted button (+) for a particular database record (in this case the database record 711) that is in the non-associated record set. In some embodiments, this user action may cause the database association management platform 700 to have the state that is depicted in FIG. 7C, in which the database record 711 is moved to the included record set for the IdentitySpec1 701 and is thus associated with a highlighted (+) button.

In some embodiments, an RSE instruction is a user-generated instruction to add a database record that is not in the included record set for an associated meta-record data structure to the excluded record set for the associated meta-record data structure. The database record that is associated with an RSE instruction is referred to as the RSE database record, while the associated meta-record data structure that is associated with an RSE instruction is referred to as the RSE associated meta-record data structure. In some embodiments, an RSE instruction rejects existence of a cross-record association relationship between an RSE database record and an RSE associated meta-record data structure.

In some embodiments, given a database that comprises R database records, the R database records can be divided into two disjoint sets based at least in part on whether they are included in a particular included record set for a particular associated meta-record data structure: a first "associated record set" that comprises those database records that are in the included record set for the particular associated meta-record data structure or in the excluded record set for the particular associated meta-record data structure, and a second "non-associated record set" that comprises those database records that are neither in the included record set for the particular associated meta-record data structure nor in the excluded record set for the particular associated meta-record data structure. For example, given a database that comprises database records R1, R2, R3, and R4, if the included record set for a particular associated meta-record data structure comprises R1 and R2, while the excluded record set for the particular associated meta-record data structure comprises R3, then the associated record set for the particular associated meta-record data structure comprises R1, R2, and R3, while the non-associated record set for the particular associated meta-record data structure comprises R4.

In some embodiments, the RSE data record must, prior to execution of database association metadata update operations corresponding to the RSE instruction, be part of the non-associated record set for the RSE associated meta-record data structure. In some embodiments, the database association management platform ensures/enforces that the RSE database record associated with an RSE instruction is selected from the non-associated record set for the RSE associated meta-record data structure that is associated with the RSE instruction. In some embodiments, the database association management platform enables an end user to provide the RSE instruction by selecting the RSE associated meta-record data structure from the set of associated meta-record data structures of a corresponding database and selecting the RSI database record from the non-associated record set for the RSE associated meta-record data structure.

An operational example of user-performed actions that are configured to generate an RSE instruction can be described in relation to FIGS. 7C-7D. As an initial matter, like FIG. 7B as described above, FIG. 7C depicts a state of the database association management platform 700 that is generated/displayed after the user has selected IdentitySpec 701 in FIG. 7A. Therefore, for the purpose of the operational example corresponding to generating the RSE instruction, the RSE associated meta-record data structure is IdentitySpec1 701. Moreover, given the state of the database association management platform 700 that is depicted in FIG. 7C, an end user may generate an RSE instruction by selecting the non-highlighted button (–) for a particular database record (in this case the database record 712) that is in the non-associated record set. In some embodiments, this user action may cause the database association management platform 700 to have the state that is depicted in FIG. 7D, in which the database record 712 is moved to the excluded record set for the IdentitySpec1 701 and is thus associated with a highlighted (–) button.

In some embodiments, an RSNI instruction is a user-generated instruction to remove a database record that is in the included record set for a particular associated meta-record data structure from the included record set for the particular associated meta-record data structure. The database record that is associated with an RSNI instruction is referred to as an RSNI database record, while the associated meta-record data structure that is associated with an RSNI instruction is referred to as an RSNI associated meta-record data structure. In some embodiments, the RSNI instruction revokes affirmation of existence of a cross-record association relationship between an RSNI database record and an RSNI associated meta-record data structure whose respective included record set comprises the RSNI database record. In some embodiments, the RSNI database record for an RSNI instruction must, prior to the execution of database association metadata update operations corresponding to the RSNI instruction, be part of the included record set for the RSNI associated meta-record data structure. In some embodiments, the database association management platform enables an end user to provide the RSNI instruction by selecting the RSNI associated meta-record data structure from the set of associated meta-record data structures of a corresponding database and selecting the RSNI database record from the respective included record set for the RSNI associated meta-record data structure.

An operational example of user-performed actions that are configured to generate an RSNI instruction can be described in relation to FIGS. 7D-7E. As an initial matter, like FIGS. 7B-7C as described above, FIG. 7D depicts a state of the database association management platform 700 that is generated/displayed after the user has selected IdentitySpec 701 in FIG. 7A. Therefore, for the purpose of the operational example corresponding to generating the RSNI instruction, the RSNI associated meta-record data structure is IdentitySpec1 701. Moreover, given the state of the database association management platform 700 that is depicted in FIG. 7D, an end user may generate an RSNI instruction by selecting the highlighted button (+) for a particular database record (in this case the database record 711) that is in the included record set. In some embodiments, this user action may cause the database association management platform 700 to have the state that is depicted in FIG. 7E, in which the database record 711 is moved to the non-associated record set for the IdentitySpec1 701 and is thus associated with a non-highlighted (+) button and a non-highlighted (–) button.

In some embodiments, an RSEI instruction is a user-generated instruction to remove a database record that is in the excluded record set for a particular associated meta-record data structure from the excluded record set for the particular associated meta-record data structure. The database record that is associated with an RSEI instruction is referred to as an RSEI database record, while the associated meta-record data structure that is associated with an RSEI instruction is referred to as an RSEI associated meta-record data structure. In some embodiments, the RSEI instruction revokes rejection of existence of a cross-record association relationship between an RSEI database record and an RSEI associated meta-record data structure whose respective excluded record set comprises the RSEI database record. In some embodiments, the RSEI database record for an RSEI instruction must, prior to the execution of database association metadata update operations corresponding to the RSEI instruction, be part of the excluded record set for the RSEI associated meta-record data structure. In some embodiments, the database association management platform enables an end user to provide the RSEI instruction by selecting the RSEI associated meta-record data structure from the set of associated meta-record data structures of a corresponding database and selecting the RSEI database record from the respective excluded record set for the RSEI associated meta-record data structure.

An operational example of user-performed actions that are configured to generate an RSEI instruction can be described in relation to FIGS. 7E-7F. As an initial matter, like FIGS. 7B-7D as described above, FIG. 7E depicts a state of the database association management platform 700 that is generated/displayed after the user has selected IdentitySpec 701 in FIG. 7A. Therefore, for the purpose of the operational example corresponding to generating the RSEI instruction, the RSEI associated meta-record data structure is IdentitySpec1 701. Moreover, given the state of the database association management platform 700 that is depicted in FIG. 7E, an end user may generate an RSEI instruction by selecting the highlighted button (−) for a particular database record (in this case the database record 712) that is in the excluded record set. In some embodiments, this user action may cause the database association management platform 700 to have the state that is depicted in FIG. 7F, in which the database record 712 is moved to the non-associated record set for the IdentitySpec1 701 and is thus associated with a non-highlighted (+) button and a non-highlighted (−) button.

In some embodiments, an NRC instruction is a user-generated instruction to assign a database record that is in the uncovered record set for a corresponding database as the first database record in the included record set of a newly-generated associated meta-record data structure. The database record that is associated with an NRC instruction is referred to as an NRC database record and the newly-generated associated meta-record data structure that is associated with an NRC instruction is referred to as an NRC associated meta-record data structure. In some embodiments, the NRC database record must, prior to the execution of database association metadata update operations corresponding to the NRC instruction, be part of the uncovered record set for the corresponding database. In some embodiments, the database association management platform enables an end user to provide the NRC instruction by selecting the NRC database record from the uncovered record set for the corresponding database.

An operational example of user-performed actions that are configured to generate an NRC instruction can be described in relation to FIGS. 8A-8B. FIG. 8A provides a state of an associated meta-record data structure creation panel 800 of a database association management platform that depicts a list of database records that are in the uncovered record set for a corresponding database, where each database record is associated with a non-highlighted (+) button. In some embodiments, when the end user selects the non-highlighted (+) button for a particular database record (here the database record 811) that is depicted by the associated meta-record data structure creation panel 800, the database association management platform transitions to a new displayed state that displays an associated meta-record data structure modification panel 850 (whose functionality may be similar to the functionalities of the user interfaces depicted in FIGS. 7A-7F) that enables modifying the included record set and/or the excluded record set of the newly-generated NSC associated meta-record data structure whose included record set initially comprises the database record 811.

Returning to FIG. 4, at step/operation 403, after receiving each record relationship instruction in the sequence of record relationship instructions, the database management computing entity 106 updates the database association metadata based at least in part on the received record relationship instruction. As described above, the database association management platform enables an end user to sequentially provide record relationship instructions and sequentially update database association metadata. In some embodiments, this means that, after receiving each record relationship instruction, the database association metadata is updated in accordance with the received record relationship instruction to generate a new state of the database association metadata, where the new state is provided to the end user via the database association management platform to enable the end user to provide instructions in relation to the new state and update the new state.

While various embodiments of the present invention describe that the database association meta-data may be updated sequentially in a manner such that each sequential update is associated with a single record relationship instruction, a person of ordinary skill in the relevant technology will recognize that, in some embodiments (e.g., where the database association metadata is remote from a database management system), each sequential update may be associated with a batch of record relationship instructions. For example, in some embodiments, record relationship instructions are added to a batch until the batch reaches a count of N record relationship instructions, where N may be a user-defined hyper-parameter of a corresponding database management system. As another example, in some embodiments, record relationship instructions are added to a batch until a threshold period of time has passed since a time associated with the creation of the batch, where the threshold period may be a user-defined hyper-parameter of a corresponding database management system. In some embodiments, once a batch of record relationship instructions is generated, database association metadata for a corresponding database is updated during a single update if the record relationship instructions in the batch are not determined to be inconsistent in relation to one another.

In some embodiments, the database association metadata operations performed in accordance with each received record relationship instruction are different based at least in part on the functional designation of the received record relationship instruction. For example, in some embodiments, updating the database association metadata based at least in part on an RSI instruction comprises updating the respective included record set for the RSI associated meta-record data structure of the RSI instruction to add the RSI database record for the RSI instruction. As another example, in some embodiments, updating the database association metadata based at least in part on an RSE instruction comprises updating the respective excluded record set for the RSE associated meta-record data structure that is associated with the RSE instruction to add the RSE database record. As a further example, updating the database association metadata based at least in part on an RSEI instruction comprises updating the respective excluded record set for an RSEI associated meta-record data structure that is associated with the RSEI instruction to remove the RSEI database record that is associated with the RSEI instruction.

In some embodiments, updating the database association metadata based at least in part on the RSNI instruction comprises updating the respective included record set for the RSNI associated meta-record data structure to remove the RSNI database record. In some of the noted embodiments, subsequent to updating the respective included record set for the RSNI associated meta-record data structure to remove the RSNI database record, in response to determining that the respective included record set for the RSNI associated meta-record data structure is empty, the RSNI associated meta-record data structure is removed. In other words, if an RSNI database record is the last remaining database record in the included record set for an RSNI associated meta-record data structure, then executing database association metadata operations corresponding to the RSNI instruction may cause removal of the RSNI associated meta-record data structure whose included record set is now empty. Accordingly, in some of the noted embodiments, prior to execution of database association metadata operations corresponding to an RSNI instruction, the database association management platform displays a warning message to the end user to inquire whether the end user intends to delete the selected associated meta-record data structure, and will proceed to perform the database association metadata operations corresponding to the RSNI instruction only if the end user interacts with the warning message by selecting to confirm the RSNI instruction.

In some embodiments, updating the database association metadata based at least in part on an NSC instruction comprises adding the NSC associated meta-record data structure as a newly-generated associated meta-record data structure that is described by the database association metadata.

At step/operation 404, the database management computing entity 106 performs one or more database management operations based at least in part on the updated database association metadata. In some embodiments, the database management operations comprise generating database aggregation metadata based at least in part on the updated database association metadata and generating one or more database query results based at least in part on the database aggregation metadata, where the database query results may be displayed using a database query result user interface that describes the generated database query results. Exemplary techniques for generating database aggregation metadata based at least in part on database association metadata are described in Subsection B of the current Section IV of the present application. In some embodiments, the database management operations comprise generating one or more database query results based at least in part on the updated database association metadata, where the database query results may be displayed using a database query result user interface that describes the generated database query results.

Other examples of database management operations include: (i) storing permeant and/or temporarily relational database tables that include data determined based at least in part on the one or more query results (e.g., data determined based at least in part on the output of one or more join operations performed based at least in part on the query results), (ii) storing data determined based at least in part on the one or more query results (e.g., data determined based at least in part on the output of one or more join operations performed based at least in part on the query results) as one or more index files for a corresponding database, (iii) setting one or more operational parameters of the corresponding database based at least in part on the one or more query results (e.g., data determined based at least in part on the output of one or more join operations performed based at least in part on the query results), (iv) storing data determined based at least in part on the one or more query results (e.g., data determined based at least in part on the output of one or more join operations performed based at least in part on the query results) as one or more files stored using memoization techniques (e.g., one or more files stored using memoization techniques on one or more cache storage mediums), and (iv) determining one or more new expected query structure for an underlying database associated with the corresponding database based at least in part on the one or more query results (e.g., data determined based at least in part on the output of one or more join operations performed based at least in part on the query results).

An operational example of a database query result user interface 900 is depicted in FIG. 9. As depicted in FIG. 9, the database query result user interface 900 includes database records that are determined to be related to a person whose name is specified by the corresponding query parameters. The query results that are depicted in the database query result user interface 900 may include at least one of the following: (i) one or more query results generated based at least in part on one or more database records that are in the included record set for an associated meta-record data structure that is mapped to the queried person using a search routine that maps queried persons to the database association metadata, or (ii) one or more query results generated based at least in part on one or more database records that are recorded to be related to one or more database aggregates that are mapped to the queried person using a search routine that maps queried persons to the database aggregation metadata.

Accordingly, as described above, various embodiments of the present invention describe techniques that enable efficient and reliable execution of database management operations by enabling an end user to generate/update database association metadata for a database via providing record relationship instructions using a database association management platform. In some embodiments, an end user may provide record relationship instructions that modify database association metadata for a database, where the database association metadata describes a set of associated meta-record data structures whose structure and record associations are governed by a set of data association integrity rules enforced by the database management platform. By guiding end users to provide record relationship instructions in a manner that is consistent with an acceptable state of the database association data as determined in accordance with the data association integrity rules, the database association management platform enables using valuable user-provided guidance to perform effective cross-record association without allowing for potential data integrity issues that are often associated with directly-provided user instructions. Because user-provided instructions provide valuable guidance/requirements for automated cross-record association operations performed by database management systems without allowing for potential data integrity issues, the noted techniques improve efficiency and reliability of database management operations by reducing the need for frequent execution of the noted database management operations. In this way, various embodiments of the present invention make important technical contributions to the field of database systems by enabling efficient and reliable execution of database management operations.

In some embodiments, the record relationship instructions described herein represent conceptual primitive operations for creating and/or associated meta-record data structures. In some embodiments, a user interface framework may enable these conceptual primitive operations and may prevent conceptual primitive operations that would generate a meta-record data structure that does not satisfy the data association integrity rules. However, when meta-record data structures are used for partitioning database records, the operations that incrementally contributed to a meta-record data structure before the meta-record data structure is submitted are not important. Only the state of the meta-record data structure as submitted influences partitioning and many sequences of instructions might generate the same meta-record data structure.

B. Generating/Updating Database Aggregation Metadata

FIG. 10 is a flowchart diagram of an example process 1000 for maintaining database aggregation metadata for a particular database based at least in part on the database association metadata for the particular database. Via the various steps/operations of the process 1000, the database management computing entity 106 can generate and/or repartition database aggregates of a database based at least in part on the associated meta-record data structures of the database as described by the database association metadata for the database, using a cross-record matching routine that ensures all generated database aggregates respect the cross-record associated relationships described by the database association metadata, and thus the database association metadata maintains a superseding/referential matching significance relative to any other cross-record matching determinations (e.g., any other cross-record automated matching determinations) performed in relation to the database records of the corresponding database. Moreover, while various embodiments of the present invention describe generating/updating database aggregation metadata for a single database, a person of ordinary skill in the relevant technology will recognize that the techniques described herein can be performed to generate/update database aggregation metadata for a group of two or more databases.

The process 1000 begins at step/operation 1001 when the database management computing entity 106 identifies (e.g., retrieves, receives, and/or the like) the database association metadata. As described above, the database association metadata may describe a set of associated meta-record data structures associated with a corresponding database. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set and the excluded record set for the associated meta-record data structure. In some embodiments, the database association metadata comprises, for each associated meta-record data structure of the corresponding database, a per-meta-record data structure (e.g., a struct data structure, an object data structure, an array data structure, a linked list data structure, and/or the like) that describes the included record set, the excluded record set, the unique identifier, and/or the last modification timestamp for the associated meta-record data structure.

In some embodiments, the database association metadata comprises, for each database aggregate of a corresponding database, a per-aggregate association data structure (e.g., a struct data structure, an object data structure, an array data structure, a linked list data structure, and/or the like) that describes at least one of: (i) if a database record of the database aggregate is part of the included record set of an associated meta-record data structure, the unique identifier of the associated meta-record data structure, or (ii) if a database record of the database aggregate is part of the excluded record set of one or more associated meta-record data structures, unique identifiers of the one or more associated meta-record data structures. Operational examples of such per-aggregate association data structures that may be described by the database association metadata are depicted in FIGS. 11-12. For example, as depicted in FIG. 11, the per-aggregate association data structure 1100 is associated with a database aggregate with at least one database record that is part of the included record set for the associated meta-record data structure with the particular unique identifier 13434 (as indicated by the specId field of the per-aggregate association data structure 1100), where the database aggregate is not associated with any database record that is part of an excluded record set (as indicated by the excludedBy field of the per-aggregate association data structure 1100). As another example, as depicted in FIG. 12, the per-aggregate association data structure 1200 is not associated with any database record that is part of an included record set (as indicated by the specId field of the per-aggregate association data structure 1200), where the database aggregate includes at least one database record that is part of the excluded record set for the associated meta-record data structure with the particular unique identifier 13434 and the excluded record set for the associated meta-record data structure with the particular unique identifier 32426 (as indicated by the excludedBy field of the per-aggregate association data structure 1200).

Returning to FIG. 10, at step/operation 1002, the database management computing entity 106 identifies a set of matched database records of the database. A set of matched database records may describe a subset of database records of the database that are determined to be matched using one or more matching routines, such as one or more automated matching routines. In some embodiments, the database records of a database are matched (e.g., using one or more automated matching routines) in order to identify/detect cross-record aggregation relationships between sets of the database records and assign each identified set comprising database records that are determined to collectively have a cross-record aggregation relationship to a database aggregate. In some embodiments, the set of matched database records identified at step/operation 1002 includes an identified subset of the database records, and the process 1000 can in some embodiments be performed for each identified subset.

In some embodiments, a database is associated with G database aggregates, where each database aggregate comprises a subset of the database records of the database that are determined (e.g., using one or more automated matching routines) to be sufficiently related in accordance with the parameters/requirements of a cross-record aggregation relationship logic. In some of the noted embodiments, once the G database aggregates are identified/retrieved/received/generated, the (database aggregates are partitioned into single database records and the database records, now individually grouped, are matched again to create sets of matched database records. Then, the sets of matched database records can be used to generate new database aggregates and update the database aggregation metadata. Importantly, this subsequent aggregation may in some embodiments be performed using a cross-record matching routine that ensures all generated database aggregates respect the cross-record associated relationships described by the database association metadata, and thus the database association metadata maintains a superseding/referential matching significance relative to any other cross-record matching determinations (e.g., any other cross-record automated matching determinations) performed in relation to the database records of the corresponding database. In this way, various embodiments of the present invention enable hierarchical database record aggregation/matching by defining hierarchically-differentiated tiers of a cross-record matching logic, for example by defining a superseding/referential hierarchical matching logic that may be generated based at least in part on manually-entered record relationship instructions as reflected in the database association metadata, where this superseding/referential hierarchical matching logic is enforced in a manner that causes any automated matching logic to conform to superseding/referential hierarchical matching logic described by the database association metadata.

At step/operation 1003, the database management computing entity 106 generates a database aggregate based at least in part on a filtered matched record subset of the set of matched database records that were identified in step/operation 1002, where the filtering of the set of matched database records is performed based at least in part on the database association metadata that was identified in step/operation 1001. For example, in some embodiments, given a set of matched database records that comprises M matched database records, where the M matched database records are in the included record sets for X associated meta-record data structures of the database as described by the database association metadata, the database management computing entity 106 generates a filtered matched record subset that comprises each matched database record of the M matched database records that is not in any of the X excluded record sets for the X associated meta-record data structures that are associated with the M matched database records, and then assigns the filtered matched record subset to a database aggregate.

A database aggregate may describe a set of database records that are assigned a golden identifier and are processed as matched database records by a database management system. In some embodiments, the database records of a database are matched (e.g., using one or more automated matching routines) in order to identify/detect cross-record aggregation relationships between sets of the database records and assign each identified set comprising database records that are determined to collectively have a cross-record aggregation relationship to a database aggregate. The database aggregates of a database may be described by the database aggregation metadata for the database, where the database aggregation metadata for a database may be used to perform one or more database management operations with respect to the database.

As described above, in some embodiments, given a set of matched database records that comprises M matched database records, where the M matched database records are in the included record sets for X associated meta-record data structures of the database as described by the database association metadata, a database aggregate is associated with the each matched database record of the M matched database records that is not in any of the X excluded record sets for the X associated meta-record data structures. For example, consider an operational example in which a set of matched record sets that comprises database records R1, R2, R3, R4, and R5 (accordingly, M=5). In this operational example, if the corresponding database is associated with two associated meta-record data structures including a first associated meta-record data structure whose included record set comprises R1 and whose excluded record set comprises R3 as well as a second associated meta-record data structure whose included record set comprises R2 and whose excluded record set comprises R4, then: (i) the set of M=5 database records is associated with X=2 associated meta-record data structures comprising the first associated meta-record data structure and the second associated meta-record data structure (as both associated meta-record data structures have an included record set that comprises at least one matched database record in the set of M=5 database records, and (ii) because R2 is in the excluded record set for the first associated meta-record data structure and R4 is in the excluded record set for the second associated meta-record data structure, those two database records are excluded from the filtered match record subset and thus the resulting database aggregate is only associated with records R1, R3, and R5.

In some embodiments, given a set of matched database records that comprises M matched database records, where the M matched database records are in the included record sets for X associated meta-record data structures of the database as described by the database association metadata, the database management computing entity 106 generates a filtered matched record subset that comprises each matched database record of the M matched database records that: (i) is in the included record set for at least one of the X included record sets for the X associated meta-record data structures, (ii) is not in any of the X excluded record sets for the X associated meta-record data structures that are associated with the M matched database records. In some embodiments, after generating a filtered matched record subset, the database management computing entity 106 then assigns the filtered matched record subset to a database aggregate. For example, consider an operational example in which a set of matched record sets that comprises database records R1, R2, R3, R4, and R5 (accordingly, M=5). In this operational example, if the corresponding database is associated with two associated meta-record data structures including a first associated meta-record data structure whose included record set comprises R1 and whose excluded record set comprises R3 as well as a second associated meta-record data structure whose included record set comprises R2 and whose excluded record set comprises R4, then: (i) the set of M=5 database records is associated with X=2 associated meta-record data structures comprising the first associated meta-record data structure and the second associated meta-record data structure (as both associated meta-record data structures have an included record set that comprises at least one matched database record in the set of M=5 database records, and (ii) because R2 is in the excluded record set for the first associated meta-record data structure and R4 is in the excluded record set for the second associated meta-record data structure, and further because R5 is not in the included record sets for any of the X=2 associated meta-record data structures, those three database records are excluded from the filtered match record subset and thus the resulting database aggregate is only associated with R1 and R5.

Accordingly, as described above, various embodiments of the present invention describe techniques that enable efficient and reliable execution of database record aggregation operations that are configured to generate database aggregates each associated with a set of records having a golden identifier. In some embodiments, a database is associated with (database aggregates, where each database aggregate comprises a subset of the database records of the database that are determined (e.g., using one or more automated matching routines) to be sufficiently related in accordance with the parameters/requirements of a cross-record aggregation relationship logic. In some of the noted embodiments, once the (database aggregates are identified/retrieved/received/generated, the G database aggregates are partitioned into database records and the database records, now individually grouped, are matched again to create sets of matched database records. Then, the sets of matched database records can be used to generate new database aggregates and update the database aggregation metadata. Importantly, this subsequent aggregation may in some embodiments be performed using a cross-record matching routine that ensures all generated database aggregates respect the cross-record associated relationships described by the database association metadata, and thus the database association metadata maintains a superseding/referential matching significance relative to any other cross-record matching determinations (e.g., any other cross-record automated matching determinations) performed in relation to the database records of the corresponding database. In this way, various embodiments of the present invention enable hierarchical database record aggregation/matching by defining hierarchically-differentiated tiers of a cross-record matching logic, for example by defining a superseding/referential hierarchical matching logic that may be generated based at least in part on manually-entered record relationship instructions as reflected in the database association metadata, where this superseding/referential hierarchical matching logic is enforced in a manner that causes any automated matching logic to conform to superseding/referential hierarchical matching logic described by the database association metadata. In this way, various embodiments of the present invention improve efficiency and reliability of execution of database record aggregation operations that are configured to generate database aggregates each associated with a set of records having a golden identifier. In this way, various embodiments of the present invention make important technical contributions to the field of database systems by enabling efficient and reliable execution of database management operations directed to generating database aggregates.

In some embodiments, partitioning database records into database aggregates is performed in a manner that respects associated meta-record data structures of an underlying database. For example, consider a database aggregate A1 that is associated with an associated meta-record data structure S1 whose included record set includes a database record R1. If R1 is updated, a proposed system may perform matching operations (e.g., in accordance with common demographic features) to detect which database aggregates should be merged with A1. In some of the noted embodiments, the noted matching operations are performed with respect to a set of database aggregates that excludes any database aggregates that are associated with associated meta-record data structures as an included associated meta-record data structure, as well as any database aggregates that are associated with associated meta-record data structures that exclude R1. In other words, any database aggregates having an associated meta-record data structure as well as any database aggregates having an associated meta-record data structure that excludes R1 are deemed to be ineligible candidates for merging.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. A computer-implemented method comprising:
providing, by one or more processors, a database association management platform comprising a user interface that enables an end user to provide an update to database association metadata of a database, wherein:
 (A) the database association metadata identifies a plurality of associated meta-record data structures,
 (B) the update to the database association metadata comprises a record relationship instruction,
 (C) the record relationship instruction comprises an affirmed cross-record association relationship, corresponding to a common entity, between a selected set of database records from a plurality of database records that belong to the database,
 (D) the plurality of associated meta-record data structures comprises configuration data that describes a plurality of first database aggregates comprising a plurality of subsets of database records from the plurality of database records,
 (E) a first associated meta-record data structure of the plurality of associated meta-record data structures represents a first database aggregate of the plurality of first database aggregates that corresponds to the common entity and comprises a description of (i) an included record set and (ii) an excluded record set,
 (F) the excluded record set is representative of a first subset of database records from the plurality of subsets of database records that comprises a rejected cross-record association relationship with a second subset of database records from the plurality of database records, wherein the rejected cross-record association relationship rejects a prior inclusion of the first subset of database records in the included record set,
 (G) the second subset of database records is assigned to the included record set based at least in part on identity information that is (i) associated with a plurality of sources and (ii) associated with one or more demographic features that are related to the common entity,
 (H) the included record set comprises a non-empty set that is disjoint from: (i) the excluded record set, and (ii) another included record set of another associated meta-record data structure of the plurality of associated meta-record data structures, and
 (I) the plurality of database records comprises: (i) a covered record set that comprises a first database record that is associated with the included record set, and (ii) an uncovered record set that comprises a second database record that is not associated with the included record set;
generating, by the one or more processors, a second database aggregate that corresponds to the common entity and comprises a third subset of database records from the plurality of database records, wherein the second database aggregate is generated by partitioning the first database aggregate based at least in part on the update to the database association metadata; and
increasing, by the one or more processors, cross-record association accuracy of the plurality of associated meta-record data structures by initiating a database management operation with respect to the database based at least in part on the update to the database association metadata.

2. The computer-implemented method of claim 1, wherein:
the record relationship instruction comprises a record-data structure inclusion (RSI) instruction that affirms an existence of a cross-record association relationship between an RSI database record and an RSI associated meta-record data structure, the database association management platform enables the end user to provide the RSI instruction by selecting the RSI associated meta-record data structure from the plurality of associated meta-record data structures and selecting the RSI database record from one or more third database records that are in the uncovered record set and that are not in the excluded record set; and updating the database association metadata based at least in part on the RSI instruction comprises updating a respective included record set for the RSI associated meta-record data structure to add the RSI database record.

3. The computer-implemented method of claim 1, wherein the record relationship instruction comprises a record-data structure exclusion (RSE) instruction that rejects an existence of a cross-record association relationship between an RSE database record and an RSE associated meta-record data structure.

4. The computer-implemented method of claim 3, wherein:

a second associated meta-record data structure of the plurality of associated meta-record data structures is associated with one or more non-associated record sets that comprise one or more third database records that are not in the included record set and are not in the excluded record set, and the database association management platform enables the end user to provide the RSE instruction by selecting the RSE associated meta-record data structure from the plurality of associated meta-record data structures and selecting the RSE database record from a non-associated record set for the RSE associated meta-record data structure.

5. The computer-implemented method of claim 3, wherein updating the database association metadata based at least in part on the RSE instruction comprises updating a respective excluded record set for the RSE associated meta-record data structure to add the RSE database record.

6. The computer-implemented method of claim 1, wherein:

the record relationship instruction comprises a record-data structure non-inclusion (RSNI) instruction that revokes an affirmation of existence of a cross-record association relationship between an RSNI database record that is in the covered record set and an RSNI associated meta-record data structure comprising a respective included record set that comprises the RSNI database record, and the database association management platform enables the end user to provide the RSNI instruction by selecting the RSNI associated meta-record data structure from the plurality of associated meta-record data structures and selecting the RSNI database record from the respective included record set.

7. The computer-implemented method of claim 6, wherein updating the database association metadata based at least in part on the RSNI instruction comprises updating the respective included record set to remove the RSNI database record.

8. The computer-implemented method of claim 7, wherein updating the plurality of associated meta-record data structures based at least in part on the RSNI instruction further comprises:

subsequent to updating the respective included record set and responsive to determining that the respective included record set is empty, removing the RSNI associated meta-record data structure from the plurality of associated meta-record data structures.

9. The computer-implemented method of claim 1, wherein:

the record relationship instruction comprises a record-data structure non-exclusion (RSEI) instruction that revokes a rejection of existence of a cross-record association relationship between an RSEI database record and an RSEI associated meta-record data structure comprising a respective excluded record set that comprises the RSEI database record, the database association management platform enables the end user to provide the RSEI instruction by selecting the RSEI associated meta-record data structure from the plurality of associated meta-record data structures and selecting the RSEI database record from the respective excluded record set, and updating the database association metadata based at least in part on the RSEI instruction comprises updating the respective excluded record set to remove the RSEI database record.

10. The computer-implemented method of claim 1, wherein initiating the database management operations comprises:

identifying a plurality of matched database records of the plurality of database records, wherein the plurality of matched database records is associated with one or more related associated meta-record data structures;

generating a third database aggregate that comprises each matched database record that is not in a respective excluded record set for the one or more related associated meta-record data structures;

generating database aggregation metadata based at least in part on the third database aggregate; and performing the database management operation based at least in part on the database aggregation metadata.

11. A system comprising one or more processors and at least one memory storing processor-executable instructions that, when executed by the one or more processors, cause the one or more processors to perform operations comprising:

providing a database association management platform comprising a user interface that enables an end user to provide an update to database association metadata of a database, wherein:

(A) the database association metadata identifies a plurality of associated meta-record data structures, (B) the update to the database association metadata comprises a record relationship instruction, (C) the record relationship instruction comprises an affirmed cross-record association relationship, corresponding to a common entity, between a selected set of database records from a plurality of database records that belong to the database, (D) the plurality of associated meta-record data structures comprises configuration data that describes a plurality of first database aggregates comprising a plurality of subsets of database records from the plurality of database records, (E) a first associated meta-record data structure of the plurality of associated meta-record data structures represents a first database aggregate of the plurality of first database aggregates that corresponds to the common entity and comprise a description of (i) an included record set and (ii) an excluded record set, (F) the excluded record set is representative of a first subset of database records from the plurality of subsets of database records that comprises a rejected cross-record association relationship with a second subset of database records from the plurality of database records, wherein the rejected cross-record association relationship rejects a prior inclusion of the first subset of database records in the included record set, (G) the second subset of database records is assigned to the included record set based at least in part on identity information that is (i) associated with a plurality of sources and (ii) associated with one or more demographic features that are related to the common entity, (H) the included record set comprises a non-empty set that is disjoint from: (i) the excluded record set, and (ii) another included record set of another associated meta-record data structure of the plurality of associated meta-record data structures, and (I) the plurality of database records comprises: (i) a covered record set that comprises a first database record that is associated with the included record set, and (ii) an uncovered record set that comprises a second database record that is not associated with the included record set;

generating a second database aggregate that corresponds to the common entity and comprises a third subset of database records from the plurality of database records, wherein the second database aggregate is generated by partitioning the first database aggregate based at least in part on the update to the database association metadata; and increasing cross-record association accuracy of the plurality of associated meta-record data structures by initiating a database management operation with respect to the database based at least in part on the update to the database association metadata.

12. The system of claim 11, wherein:
the record relationship instruction comprises a record-data structure inclusion (RSI) instruction that affirms an existence of a cross-record association relationship between an RSI database record and an RSI associated meta-record data structure,
the database association management platform enables the end user to provide the RSI instruction by selecting the RSI associated meta-record data structure from the plurality of associated meta-record data structures and selecting the RSI database record from one or more third database records that are in the uncovered record set and that are not in the excluded record set; and
to update the database association metadata based at least in part on the RSI instruction, the operations further comprise updating a respective included record set for the RSI associated meta-record data structure to add the RSI database record.

13. The system of claim 11, wherein the record relationship instruction comprises a record-data structure exclusion (RSE) instruction that rejects an existence of a cross-record association relationship between an RSE database record and an RSE associated meta-record data structure.

14. The system of claim 13, wherein:
a second associated meta-record data structure of the plurality of associated meta-record data structures is associated with one or more non-associated record sets that comprise one or more third database records that are not in the included record set and are not in the excluded record set, and
the database association management platform enables the end user to provide the RSE instruction by selecting the RSE associated meta-record data structure from the plurality of associated meta-record data structures and selecting the RSE database record from a non-associated record set for the RSE associated meta-record data structure.

15. The system of claim 13, wherein to update the database association metadata based at least in part on the RSE instruction, the operations further comprise updating a respective excluded record set for the RSE associated meta-record data structure to add the RSE database record.

16. The system of claim 11, wherein:
the record relationship instruction comprises a record-data structure non-inclusion (RSNI) instruction that revokes an affirmation of existence of a cross-record association relationship between an RSNI database record that is in the covered record set and an RSNI associated meta-record data structure comprising a respective included record set that comprises the RSNI database record, and
the database association management platform enables the end user to provide the RSNI instruction by selecting the RSNI associated meta-record data structure from the plurality of associated meta-record data structures and selecting the RSNI database record from the respective included record set.

17. The system of claim 16, wherein to update the database association metadata based at least in part on the RSNI instruction, the operations further comprise updating the respective included record set to remove the RSNI database record.

18. The system of claim 11, wherein:
the record relationship instruction comprises a record-data structure non-exclusion (RSEI) instruction that revokes a rejection of existence of a cross-record association relationship between an RSEI database record and an RSEI associated meta-record data structure comprising a respective excluded record set that comprises the RSEI database record,
the database association management platform enables the end user to provide the RSEI instruction by selecting the RSEI associated meta-record data structure from the plurality of associated meta-record data structures and selecting the RSEI database record from the respective excluded record set, and
to update the database association metadata based at least in part on the RSEI instruction, the operations further comprise updating the respective excluded record set to remove the RSEI database record.

19. One or more non-transitory computer-readable storage media including instructions that, when executed by one or more processors, cause the one or more processors to perform operations comprising:
providing a database association management platform comprising a user interface that enables an end user to provide an update to database association metadata of a database, wherein:
(A) the database association metadata identifies a plurality of associated meta-record data structures,
(B) the update to the database association metadata comprises a record relationship instruction,
(C) the record relationship instruction comprises an affirmed cross-record association relationship, corresponding to a common entity, between a selected set of database records from a plurality of database records that belong to the database, (D) the plurality of associated meta-record data structures comprises configuration data that describes a plurality of first database aggregates comprising a plurality of subsets of database records from the plurality of database records, (E) a first associated meta-record data structure of the plurality of associated meta-record data structures represents a first database aggregate of the plurality of first database aggregates that corresponds to the common entity and comprise a description of (i) an included record set and (ii) an excluded record set, (F) the excluded record set is representative of a first subset of database records from the plurality of subsets of database records that comprises a rejected cross-record association relationship with a second subset of database records from the plurality of database records, wherein the rejected cross-record association relationship rejects a prior inclusion of the first subset of database records in the included record set, (G) the second subset of database records is assigned to the included record set based at least in part on identity information that is (i) associated with a plurality of sources and (ii) associated with one or more demographic features that are related to the common entity, (H) the included record set comprises a non-empty set that is disjoint from: (i) the excluded record set, and (ii) another included record set of another associated meta-record data structure of the plurality of associated meta-record data structures, and (I) the plurality of database records comprises: (i) a covered record set that comprises a first database record that is associated with the included record set, and (ii) an uncovered record set that comprises a second database record that is not associated with the included record set;

generating a second database aggregate that corresponds to the common entity and comprises a third subset of database records from the plurality of database records, wherein the second database aggregate is generated by partitioning the first database aggregate based at least in part on the update to the database association metadata; and increasing cross-record association accuracy of the plurality of associated meta-record data structures by initiating a database management operation with respect to the database based at least in part on the update to the database association metadata.

20. The one or more non-transitory computer-readable storage media of claim 19, wherein:

the record relationship instruction comprises a record-data structure inclusion (RSI) instruction that affirms an existence of a cross-record association relationship between an RSI database record and an RSI associated meta-record data structure, the database association management platform enables the end user to provide the RSI instruction by selecting the RSI associated meta-record data structure from the plurality of associated meta-record data structures and selecting the RSI database record from one or more third database records that are in the uncovered record set and that are not in the excluded record set; and to update the database association metadata based at least in part on the RSI instruction, the operations further comprise updating a respective included record set for the RSI associated meta-record data structure to add the RSI database record.

\* \* \* \* \*